United States Patent
Lin

(10) Patent No.: US 12,213,590 B2
(45) Date of Patent: Feb. 4, 2025

(54) HIGH STRENGTH BLOW-MOLDED STRUCTURE

(71) Applicant: Dongguan Shichang Metals Factory Ltd., DongGuan (CN)

(72) Inventor: Chen-Kang Lin, DongGuan (CN)

(73) Assignee: Dongguan Shichang Metals Factory Ltd., DongGuan (CN)

( * ) Notice: Subject to any disclaimer, the term of this patent is extended or adjusted under 35 U.S.C. 154(b) by 252 days.

(21) Appl. No.: 17/893,437

(22) Filed: Aug. 23, 2022

(65) Prior Publication Data

US 2023/0000250 A1    Jan. 5, 2023

Related U.S. Application Data

(63) Continuation-in-part of application No. 29/846,332, filed on Jul. 15, 2022, and a continuation-in-part of
(Continued)

(30) Foreign Application Priority Data

Aug. 22, 2022    (CN) .................................. 377978066

(51) Int. Cl.
*A47B 96/20*    (2006.01)
*A47B 13/08*    (2006.01)
(Continued)

(52) U.S. Cl.
CPC .............. *A47B 96/20* (2013.01); *A47B 13/08* (2013.01); *A47C 5/12* (2013.01); *A47C 7/16* (2013.01);
(Continued)

(58) Field of Classification Search
CPC ............. A47B 96/20; A47B 13/08; A47C 7/16
See application file for complete search history.

(56) References Cited

U.S. PATENT DOCUMENTS

| 2,990,094 A | 6/1961 | Reifers |
| D198,145 S | 5/1964 | Randall |
| (Continued) | | |

FOREIGN PATENT DOCUMENTS

WO    2014186921 A1    11/2014

OTHER PUBLICATIONS

Extended European Search Report for EP App. No. 19163365.0, dated Jul. 5, 2019, 9 pages.

*Primary Examiner* — David Sample
*Assistant Examiner* — Donald M Flores, Jr.
(74) *Attorney, Agent, or Firm* — Luedeka Neely, P.C.

(57) ABSTRACT

A blow-molded plastic frame of a portable collapsible sign includes a first outer portion, a second outer portion spaced apart from the first outer portion, and a pattern of structural stiffening features formed in the first and second outer portions. The pattern comprises rows and columns of first depressions extending from the first outer portion into a hollow interior portion between the first and second outer portions, and rows and columns of second depressions extending from the second outer portion into the hollow interior portion. Each first depression has a first floor comprising three first arms having rotational symmetry. Each first arm is rotated from another first arm by 120 degrees. Each second depression has a second floor comprising three second arms having rotational symmetry. Each second arm is rotated from another second arm by 120 degrees. The first floor of each first depression is aligned with the second floor of an adjacent second depression.

22 Claims, 14 Drawing Sheets

(Section D-D)

Related U.S. Application Data application No. 17/500,270, filed on Oct. 13, 2021, now Pat. No. 11,564,493, which is a continuation of application No. 16/299,302, filed on Mar. 12, 2019, now Pat. No. 11,147,377, which is a continuation-in-part of application No. 15/975,915, filed on May 10, 2018, now Pat. No. 10,981,319, and a continuation-in-part of application No. 29/640,977, filed on Mar. 19, 2018, now Pat. No. Des. 909,802, and a continuation-in-part of application No. 29/640,679, filed on Mar. 16, 2018, now Pat. No. Des. 884,487.

(60) Provisional application No. 62/645,216, filed on Mar. 20, 2018.

(51) Int. Cl.

| | | |
|---|---|---|
| *A47C 5/12* | (2006.01) | |
| *A47C 7/16* | (2006.01) | |
| *B29C 49/00* | (2006.01) | |
| *B29C 49/02* | (2006.01) | |
| *B29C 49/20* | (2006.01) | |
| *E04C 2/32* | (2006.01) | |
| *B29L 31/44* | (2006.01) | |

(52) U.S. Cl.
CPC .......... *B29C 49/0005* (2013.01); *B29C 49/02* (2013.01); *B29C 49/20* (2013.01); *E04C 2/326* (2013.01); *B29C 49/0031* (2013.01); *B29C 2049/2008* (2013.01); *B29L 2031/448* (2013.01); *E04C 2/32* (2013.01); *Y10T 428/24628* (2015.01); *Y10T 428/24661* (2015.01); *Y10T 428/24669* (2015.01); *Y10T 428/24702* (2015.01); *Y10T 428/24736* (2015.01)

(56) References Cited

U.S. PATENT DOCUMENTS

| | | |
|---|---|---|
| D198,146 S | 5/1964 | Randall |
| D305,405 S | 1/1990 | Wilkinson |
| D438,792 S | 3/2001 | Pero et al. |
| D447,684 S | 9/2001 | Högman |
| D465,417 S | 11/2002 | Apps |
| D509,386 S | 9/2005 | Haney |
| D514,452 S | 2/2006 | Enriquez |
| 7,069,865 B2 | 7/2006 | Strong et al. |
| 7,111,563 B2 | 9/2006 | Strong |
| 7,171,910 B2 | 2/2007 | Neunzert et al. |
| 7,331,297 B2 | 2/2008 | Strong et al. |
| D567,672 S | 4/2008 | Sheu |
| 7,475,643 B2 | 1/2009 | Haney et al. |
| D606,415 S | 12/2009 | Lavigne et al. |
| 7,634,970 B2 | 12/2009 | Strong et al. |
| 7,644,667 B2 | 1/2010 | Strong et al. |
| 7,814,844 B2 | 10/2010 | Haney et al. |
| D632,977 S | 2/2011 | Dijsktra et al. |
| 8,006,630 B2 | 8/2011 | Strong et al. |
| 8,033,228 B2 | 10/2011 | Haney et al. |
| 8,261,676 B2 | 9/2012 | VanNimwegen et al. |
| 8,302,541 B2 | 11/2012 | Haney et al. |
| 8,342,107 B2 | 1/2013 | Mower et al. |
| 8,381,665 B2 | 2/2013 | Stanford |
| 8,381,666 B2 | 2/2013 | Stanford |
| 8,438,982 B2 | 5/2013 | Stanford |
| 8,578,865 B2 | 11/2013 | Haney et al. |
| 8,746,155 B2 | 6/2014 | Haney et al. |
| D735,585 S | 8/2015 | Tayara |
| D851,502 S | 6/2019 | Tayara |
| D866,007 S | 11/2019 | Nye et al. |
| D866,008 S | 11/2019 | Nye et al. |
| D866,009 S | 11/2019 | Nye et al. |
| D873,442 S | 1/2020 | Nye et al. |
| 2003/0217676 A1* | 11/2003 | Strong .................. A47B 3/087 108/127 |
| 2005/0103239 A1 | 5/2005 | Neunzert et al. |
| 2005/0160950 A1 | 7/2005 | Haney et al. |
| 2005/0249920 A1 | 11/2005 | Kawakami et al. |
| 2006/0230989 A1 | 10/2006 | Haney et al. |
| 2010/0000448 A1 | 1/2010 | Lin et al. |
| 2011/0303355 A1 | 12/2011 | Sumi et al. |
| 2014/0037910 A1 | 2/2014 | Leng |
| 2017/0238698 A1 | 8/2017 | Nye et al. |
| 2019/0283304 A1* | 9/2019 | Lin ........................ A47B 13/08 |
| 2021/0304645 A1* | 9/2021 | Owen ................ G09F 15/0012 |

\* cited by examiner (Section D-D)

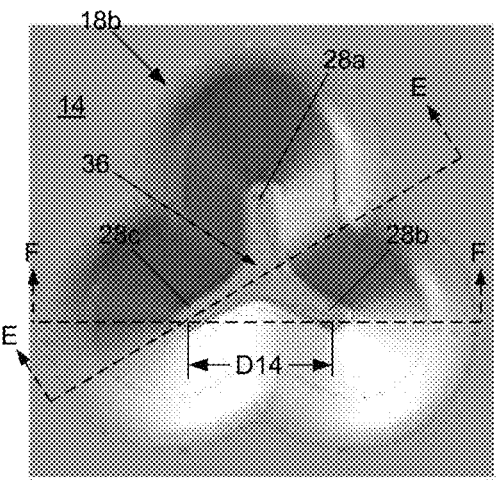
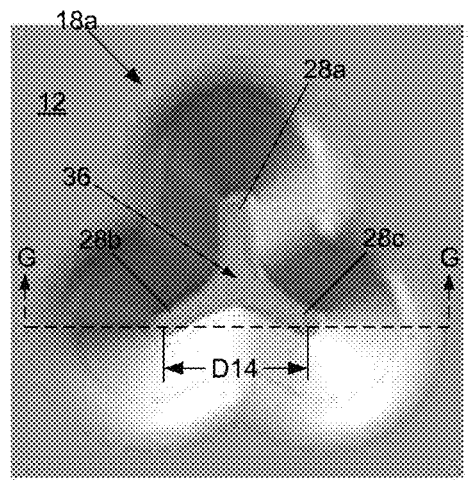
FIG. 17A  FIG. 17B
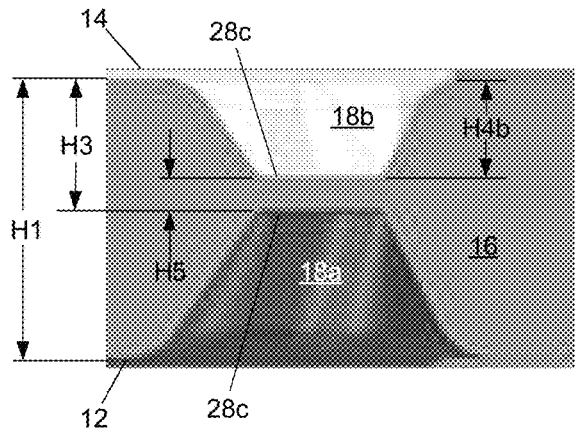
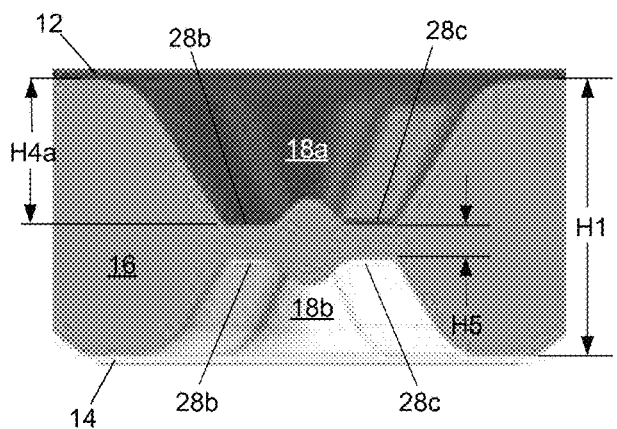
FIG. 17C
(Section E-E)
FIG. 17E
(Section G-G)
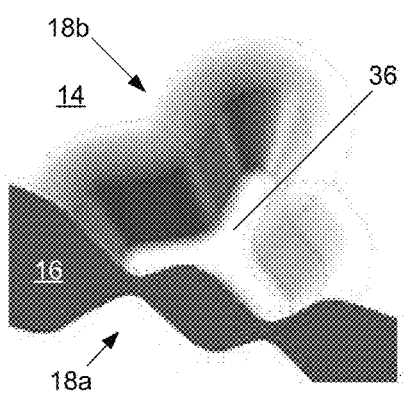
FIG. 17D
(Section F-F)

HIGH STRENGTH BLOW-MOLDED STRUCTURE

RELATED APPLICATIONS

This application claims priority to U.S. design patent application Ser. No. 29/846,332, filed Jul. 19, 2022, titled Portable Collapsible Sign with Ornamental Surface, and to U.S. utility patent application Ser. No. 17/500,270, filed Oct. 13, 2021, titled HIGH STRENGTH BLOW-MOLDED STRUCTURE, which is a continuation of U.S. patent application Ser. No. 16/299,302, filed Mar. 12, 2019, titled HIGH STRENGTH BLOW-MOLDED STRUCTURE, which issued as U.S. Pat. No. 11,147,377 on Oct. 19, 2021, and which claims priority to:

U.S. patent application Ser. No. 15/975,915, filed May 10, 2018, titled HIGH STRENGTH BLOW-MOLDED STRUCTURE (as a continuation-in-part), which issued as U.S. Pat. No. 10,981,319 on Apr. 20, 2021;

U.S. provisional patent application Ser. No. 62/645,216, filed Mar. 20, 2018, titled HIGH STRENGTH BLOW-MOLDED STRUCTURE;

U.S. design patent application Ser. No. 29/640,679, filed Mar. 16, 2018, titled BLOW-MOLDED STRUCTURE (as a continuation-in-part), which issued as U.S. Design Pat. No. D884,487 on May 19, 2020; and U.S. design patent application Ser. No. 29/640,977, filed Mar. 19, 2018, titled BLOW-MOLDED STRUCTURE (as a continuation-in-part), which issued as U.S. Design Pat. No. D909,802 on Feb. 9, 2021, the entire contents of which are incorporated herein by reference.

TECHNICAL FIELD

The disclosure relates to structures constructed from blow-molded plastic and, in particular, to high-strength, low-weight, blow-molded plastic structures.

BACKGROUND

Various items, such as tables, chairs, partitions, walls, sports equipment and signage are formed from plastic. In order to reduce the weight of the items, blow-molded plastic is typically used. A blow-molded plastic structure has outer walls that enclose an interior hollow space. While the hollow interior enables the structures to be light-weight, the hollow interior of such blow-molded items may also reduce the strength of the item so that the item is unable to support a relatively large amount of weight or force.

It is known that strengthening ribs made of metal or other durable material may be added to a blow-molded structure to increase the load-bearing strength of the structure. However, such strengthening ribs often significantly increase the weight of the structure and may create stress points in attachment locations that lead to mechanical failure of the structure.

Strengthening ribs may also be integrally formed from plastic during the blow-molding process in order to increase the load-bearing capability of the blow-molded structure. Such ribs may extend over portions of the length and width of the structure to provide load-bearing support for the structure. However, the integrally formed ribs typically require the use of thicker walls that add weight to the structure, increase production time, and increase the cost of producing such structures. The ribs may also interfere with other components of the structure, such as support legs for a table-top made of the blow-molded structure.

In view of the foregoing, there continues to be a need for blow-molded structures having improved load-bearing capability and a simple light-weight configuration.

SUMMARY

Accordingly, embodiments described herein provide a blow-molded plastic structure having a hollow interior portion formed during a blow-molding process. In a preferred embodiment, the blow-molded plastic structure includes a first outer portion, a second outer portion that is spaced apart from the first outer portion, and a pattern of structural stiffening features that are integrally formed in the first and second outer portions. A hollow interior portion is disposed between the first and second outer portions, wherein a distance between the first and second outer portions is defined by a first height. The pattern of structural stiffening features includes a plurality of first depressions and a plurality of second depressions. The first depressions extend from the first outer portion into the hollow interior portion, and are disposed in rows and columns. Each first depression includes a first floor spaced apart from the first outer portion. The first floor comprises a plurality of first arms, wherein one or more of the first arms are rotated with respect to an adjacent one of the first arms by a first angle. The second depressions extend from the second outer portion into the hollow interior portion, and are disposed in rows and columns. Each second depression includes a second floor spaced apart from the second outer portion. The second floor comprises a plurality of second arms, wherein one or more of the second arms are rotated with respect to an adjacent one of the second arms by a second angle. In the preferred embodiment, the first floor of each first depression is aligned with the second floor of an adjacent second depression.

In some embodiments, the plurality of first arms comprise three first arms, the plurality of second arms comprise three second arms, the first angle is 120 degrees, and the second angle is 120 degrees.

In some embodiments, the center-to-center spacing between first depressions in each row of first depressions is greater than three times the first height, and the center-to-center spacing between second depressions in each row of second depressions is greater than three times the first height.

In some embodiments, the center-to-center spacing between first depressions in each row of first depressions is about 63 millimeters, and the center-to-center spacing between second depressions in each row of second depressions is about 63 millimeters.

In some embodiments, the center-to-center spacing between first depressions in each column of first depressions is greater than two times the first height, and the center-to-center spacing between second depressions in each column of second depressions is greater than two times the first height.

In some embodiments, the center-to-center spacing between first depressions in each column of first depressions is about 50 millimeters, and the center-to-center spacing between second depressions in each column of second depressions is about 50 millimeters.

In some embodiments, the first height ranges from about 13.7 millimeters to about 20.3 millimeters.

In some embodiments, the first floor of each first depression is spaced away from the first outer portion by a second height that ranges from about 7.5 millimeters to 11.5 millimeters.

In some embodiments, the second floor of each second depression is spaced away from the second outer portion by a third height that ranges from about 2.5 millimeters to 6.5 millimeters.

In some embodiments, the first floor of each first depression is spaced away from the second floor of an adjacent second depression by a fourth height that ranges from about 2 millimeters to 5 millimeters.

In some embodiments, each of the first arms of the first floor of each first depression is aligned with a corresponding one of the second arms of the second floor of an adjacent second depression.

In some embodiments, the blow-molded plastic structure comprises a portion of a frame of a portable collapsible sign.

In another aspect, embodiments described herein provide a blow-molded plastic frame for a portable collapsible sign. In a preferred embodiment, the frame includes a first outer portion, a second outer portion that is spaced apart from the first outer portion, and a pattern of structural stiffening features that are integrally formed in the first and second outer portions. A hollow interior portion is disposed between the first and second outer portions, wherein a distance between the first and second outer portions is defined by a first height. The pattern of structural stiffening features includes a plurality of first depressions and a plurality of second depressions. The first depressions extend from the first outer portion into the hollow interior portion, and are disposed in rows and columns. Each first depression includes a first floor spaced apart from the first outer portion. The first floor comprises three first arms having rotational symmetry, with each first arm rotated from another first arm by 120 degrees. The second depressions extend from the second outer portion into the hollow interior portion, and are disposed in rows and columns. Each second depression includes a second floor spaced apart from the second outer portion. The second floor comprises three second arms having rotational symmetry, with each second arm rotated from another second arm by 120 degrees. In the preferred embodiment, the first floor of each first depression is aligned with the second floor of an adjacent second depression.

The foreoing and other aspects, features and advantages of the disclosed embodiments will become more fully apparent from the following detailed description of preferred embodiments and appended claims.

BRIEF DESCRIPTION OF THE DRAWINGS

The appended drawings contain figures illustrating aspects of preferred embodiments of the disclosure and further clarifying advantages and features of the disclosed embodiments. It will be appreciated that the drawings depict only preferred embodiments and are not intended to limit the scope of the claims. Accordingly, the disclosed embodiments are described and explained with additional specificity and detail through the use of the accompanying drawings in which:

FIGS. 17A-17E depict detailed views of portions of the panel depicted in FIGS. 15A and 15B.

DETAILED DESCRIPTION OF THE PREFERRED EMBODIMENTS

As set forth above, the disclosure is generally directed to blow-molded structures that have increased strength and light weight. While strength and weight are important considerations, it will be appreciated that the blow-molded structures described herein may be adapted for use with other structures that do not require increased strength and light weight.

As used herein, the terms top and bottom, front and rear, right and left, horizontal and vertical, and row and column are intended to provide understanding with regard to the figures and are not intended to limit the orientation of the disclosed structures. The blow-molded structures described herein may be disposed in a variety of desired positions—including various angles, sideways and even upside-down.

First Embodiment

Figure 1:
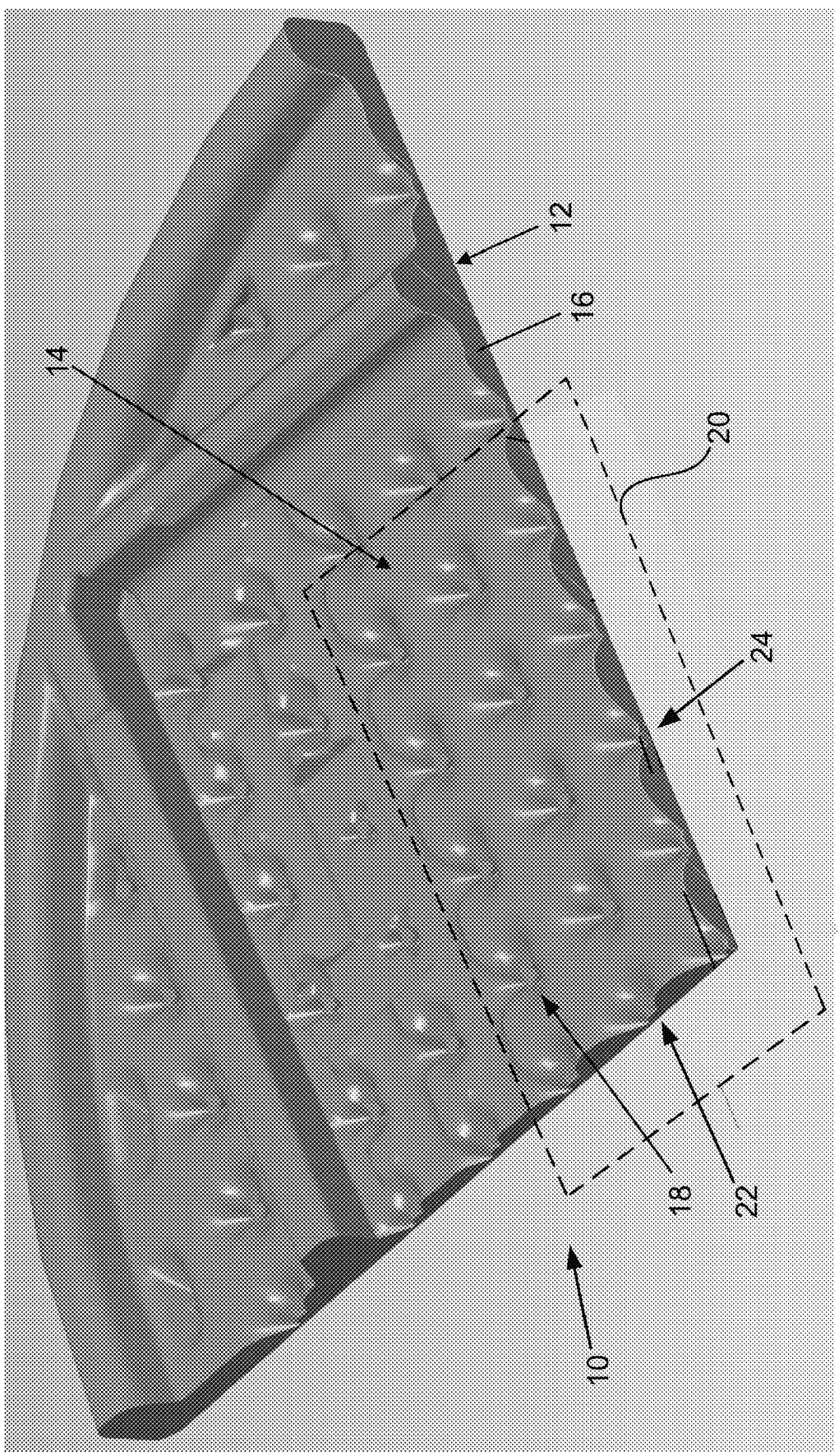
FIG. 1 is a partial perspective view of a second outer portion of a blow-molded plastic structure according to a first embodiment.
Figure 2:
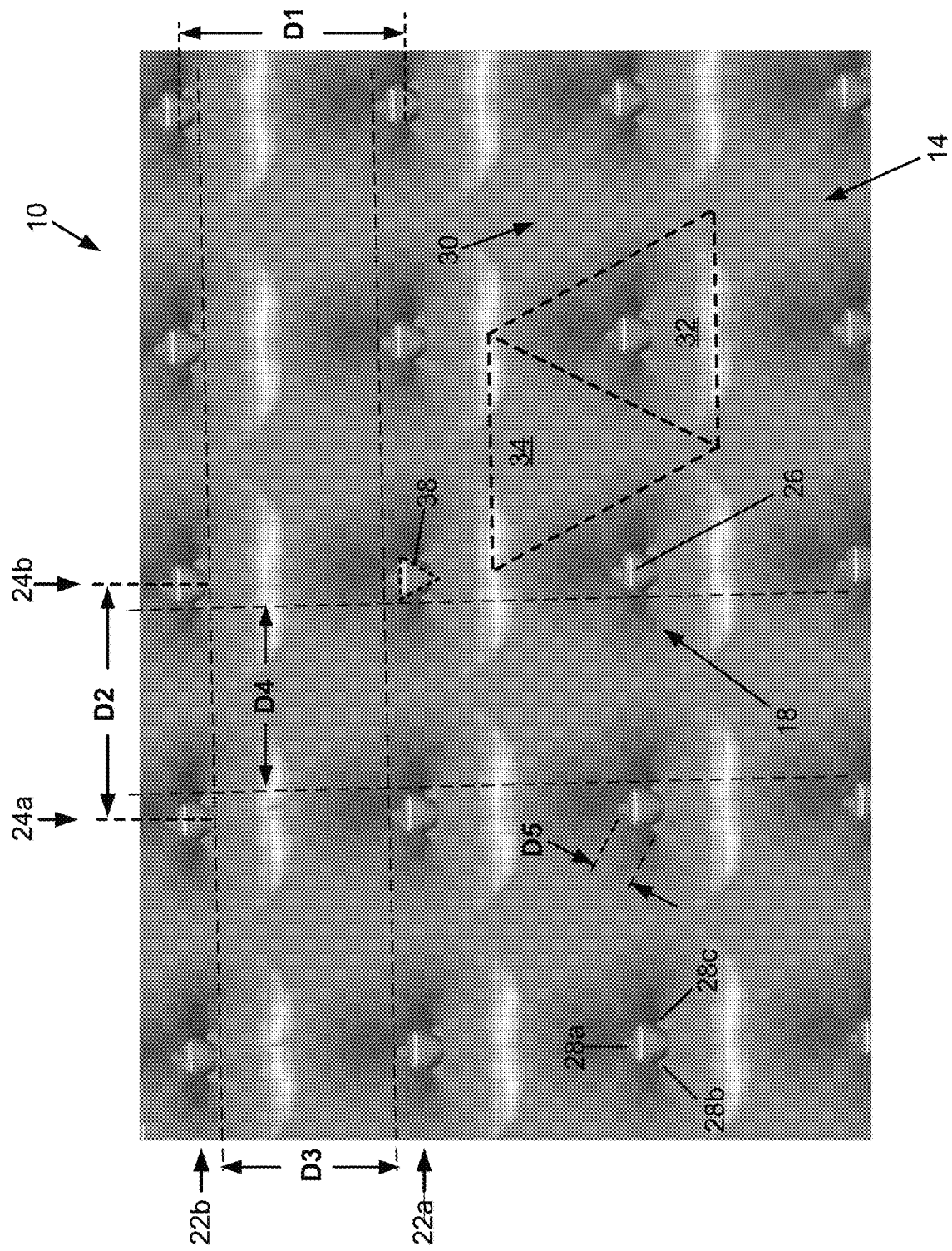
FIG. 2 is a partial plan view of the second outer portion of a blow-molded plastic structure according to the first embodiment.
Figure 4:
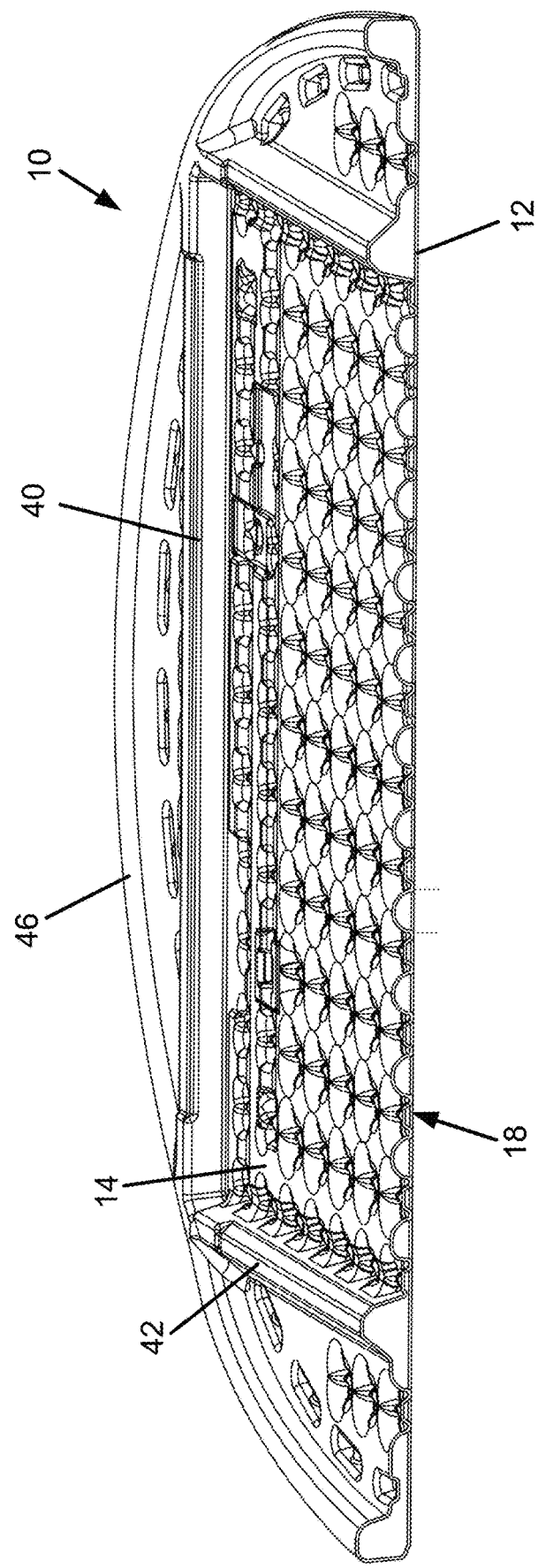
FIG. 4 is a cross-sectional perspective view of a portion of a tabletop containing a blow-molded plastic structure according to first embodiment.
Figure 5:
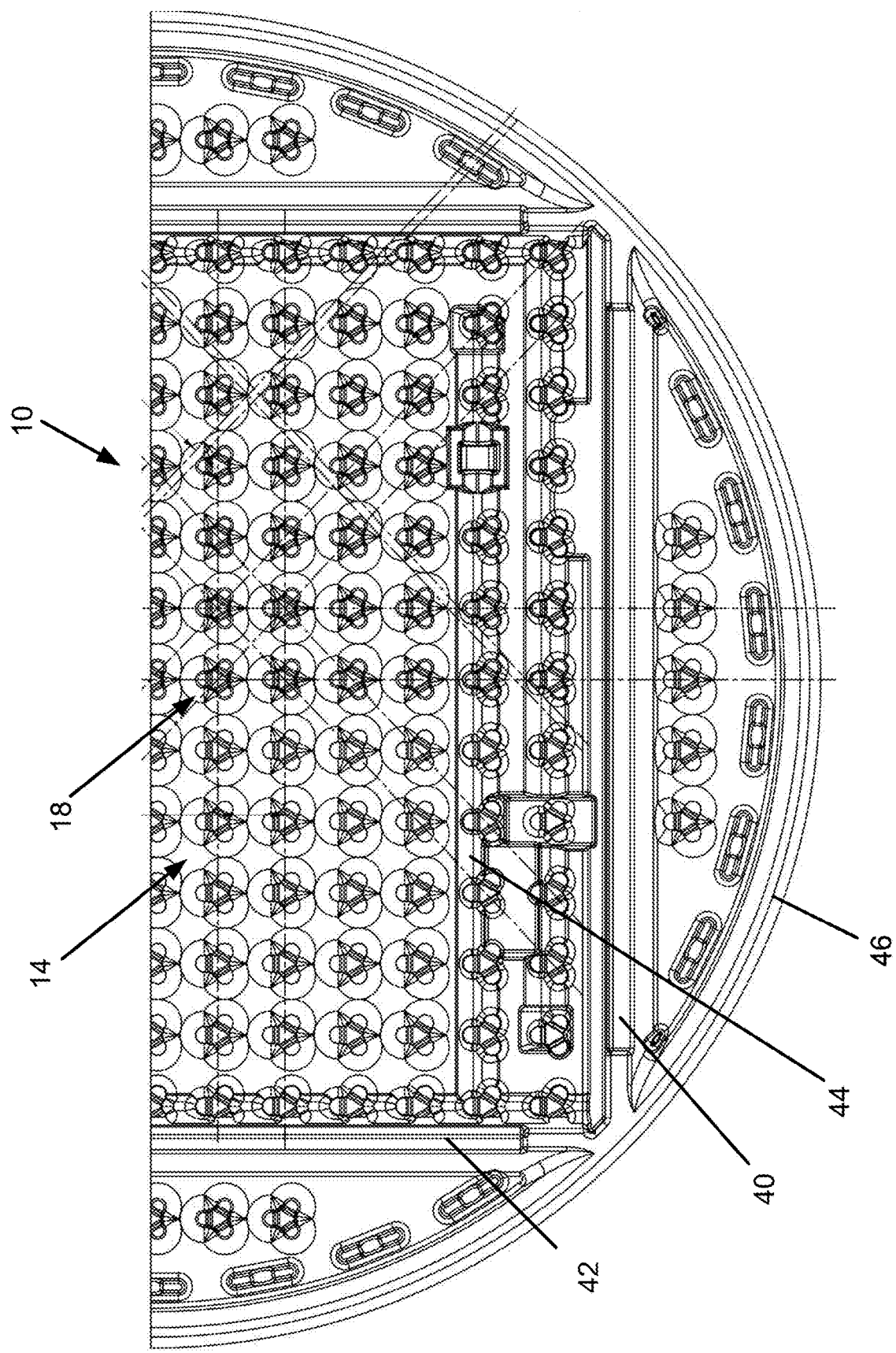
FIG. 5 is a plan view of a second outer portion of a tabletop containing a blow-molded plastic structure according to the first embodiment.

With reference now to FIGS. 1 and 2, there is shown in perspective and plan views, a portion of a blow-molded plastic structure 10 according to a first embodiment of the invention. The structure 10 includes a first outer portion 12, and a second outer portion 14 that is generally spaced apart from the first outer portion 12. In some embodiments, the first outer portion 12 is generally planar. The first outer portion 12 and the second outer portion 14 enclose a hollow interior portion 16 formed during the blow-molding process. Specifically, the disclosure is directed to a pattern of structural stiffening features that include tripodal depressions 18 formed as part of the second outer portion 14 of the structure 10, such as the pattern of tripodal depressions 18 within the dashed line box 20. Each depression 18 extends toward the first outer portion 12 of the structure. The depressions 18 are arranged in rows 22 and columns 24 in the second outer portion 14 of the structure 10, and this pattern may be repeated over a substantial portion of the second outer portion 14 of the structure. As shown in FIGS. 4 and 5, the rows 22 and columns 24 may be arranged such that each tripodal depression 18 is closely adjacent to another tripodal depression 18 in an adjacent row 22 and column 24 over a substantial portion of the second outer portion 14.

Referring now to FIG. 2, a plan view of the second outer portion 14 of the first embodiment of the structure 10 is shown. In the center of each depression 18 is a three-sided island 26 space part from the first outer portion 12. Each depression 18 also includes an indentation adjacent to each side of the three sided island 26, shown as indentations 28a, 28b and 28c. Accordingly, as shown, the indentations 28a-c and island 26 form the central portion of the tripodal depression 18 in the second outer portion 14 of the structure 10. In the first embodiment, the center-to-center spacing D5 between the indentations 28a-c within each depression 18 ranges from about 11 mm to about 14 mm, and is preferably 12.5 mm. A centerline of each row 22a of tripodal depressions 18 is spaced apart from an adjacent row 22b by a distance D1 that ranges from about 62.3 mm to about 68.8 mm, and is preferably 65.5 mm. Likewise, each column 24a of tripodal depressions 18 is spaced apart from an adjacent column 24b by a distance D2 that ranges from about 65.5 mm to about 72.5 mm, and is preferably 69.0 mm. As shown, the indentations 28a in one row 22a are spaced from indentations 28b and 28c in an adjacent row 22b by a distance D3 that ranges from about 47.9 mm to about 52.9 mm, and is preferably 50.4 mm. The indentations 28b in column 24b are spaced from indentations 28c in column 24a by a distance D4 that ranges from about 53.3 mm to about 58.9 mm, and is preferably 56.1 mm.

Although a preferred embodiment includes three indentations 28a-28c in each depression 18 that form a tripodal depression structure, other embodiments may include more than three indentations. For example, one embodiment provides four indentations arranged in a rectangular layout within each depression 18, thereby forming a quadripedal depression structure. Multi-indentation depression structures are generally referred to herein as multipedal depression structures.

Figure 3:
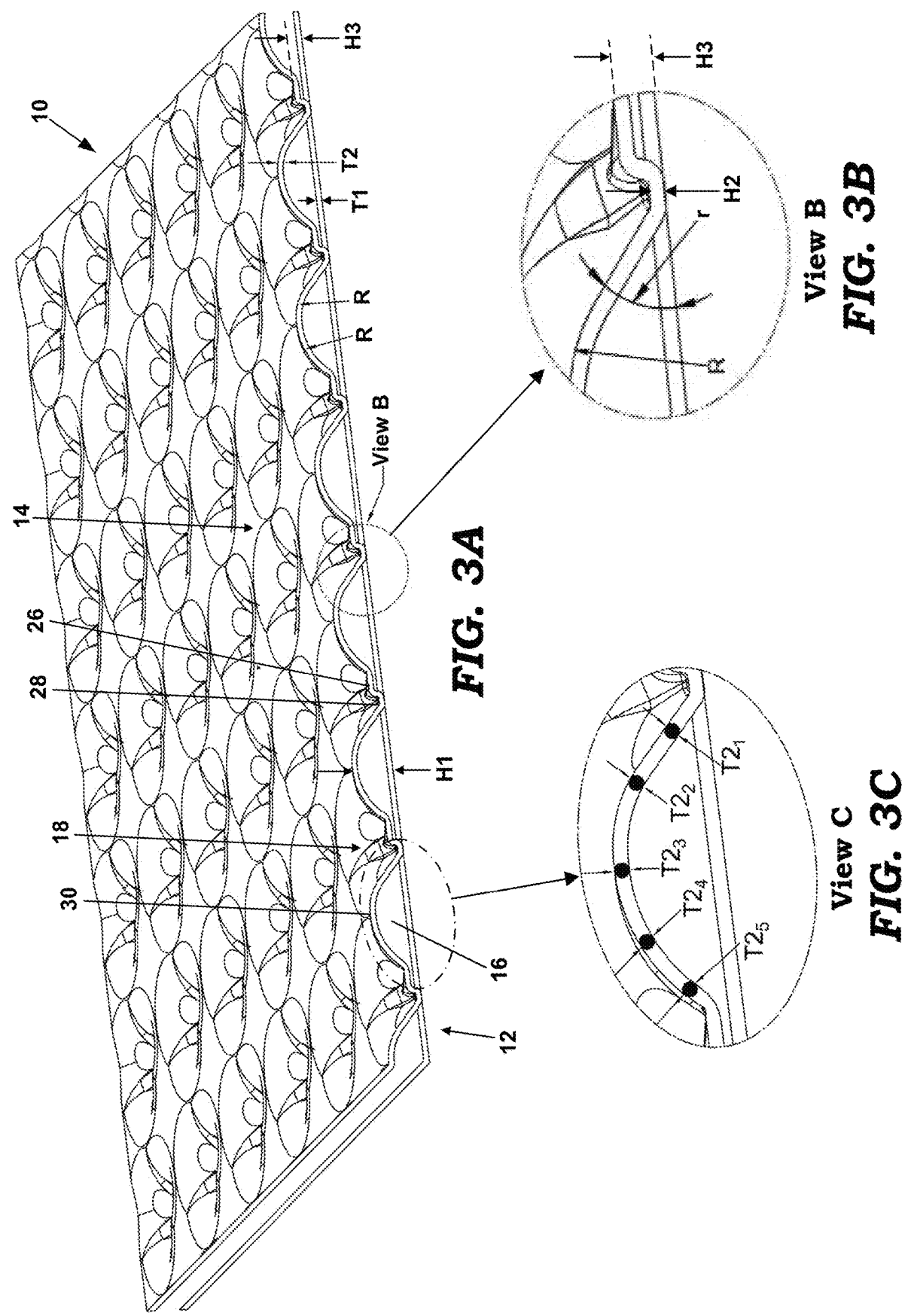
FIGS. 3A, 3B, and 3C are partial cross-sectional perspective views of a blow-molded plastic structure according to the first embodiment.

With reference to FIGS. 3A, 3B, and 3C, a partial perspective, cross-sectional view of the first embodiment of the plastic molded structure 10 is illustrated. As shown, the structural stiffening features include convex regions 30 of the second outer portion 14 that are disposed between the depressions 18 and have a height H1 (distance from the first outer portion 12) that ranges from about 17.5 mm to about 19.3 mm, and is preferably 18.4 mm. The radius R of curvature ranges from about 22 mm to about 26 mm, and is preferably 24.0 mm.

As shown in FIG. 3B, within each indentation 28a-28c, the height H2 between the second outer portion 14 and the first outer portion 12 ranges from about 2.5 mm to about 3.3 mm, and is preferably less than about 16% of the height H1. In a preferred embodiment, the height H2 is 2.9 mm. Also within each indentation 28a-28c, the second outer portion 14 may be spaced apart from or may contact the first outer portion 12 of the blow-molded plastic structure, depending on the load placed on the structure 10. The three-sided islands in the depressions 18 have a central height H3 that is preferably more than about 37% of the height H1 and less than about 2.4 times the height H2. The height H3 may range from about 6.0 mm to about 7.5 mm, and is preferably 6.9 mm. The total depth of the each indentation 28a-28c (H1-H2) and is preferably at least about 84% of the height H1.

Also shown in FIG. 3B, an angle r is formed between the first outer portion 12 and the second outer portion 14. In various embodiments, the angle r may range from about 38 degrees to about 55 degrees. In one preferred embodiment, the angle r is about 40.6 degrees.

This pattern of structural stiffening features, including the convex regions 30 and the depressions 18, provides improved strength to the blow molded plastic structure 10 and reduces the flexibility of the structure 10 under a load.

In order to provide the desired structural performance of the blow-molded plastic structure 10, the plastic material of the second outer portion 14 typically has a material thickness T2 ranging from about 2.06 mm to about 2.54 mm. In a preferred embodiment depicted in FIG. 3C, the material thickness of the second outer portion 14 may vary across the convex region 30. Table 1 below provides three examples of material thicknesses at five points within the convex region 30. As listed in Table 1, the dimensions T1, H1, H2, and H3 are slightly different in each example. As will be appreciated by those skilled in the art, the plastic thicknesses T2 and T1 of outer portions 14 and 12 may vary depending on the particular application for the blow-molded plastic structure 10. Accordingly, a relatively light-weight blow-molded plastic structure 10 may be provided by using the structural configuration described herein.

TABLE 1

| Example | T1 | $T2_1$ | $T2_2$ | $T2_3$ | $T2_4$ | $T2_5$ | H1 | H2 | H3 |
|---|---|---|---|---|---|---|---|---|---|
| 1 | 2.15 | 2.25 | 2.27 | 2.29 | 2.25 | 2.06 | 18.39 | 2.87 | 6.85 |
| 2 | 2.51 | 2.45 | 2.36 | 2.49 | 2.54 | 2.38 | 18.52 | 3.06 | 6.73 |
| 3 | 2.41 | 2.40 | 2.51 | 2.45 | 2.34 | 2.24 | 18.56 | 3.01 | 6.81 |

Referring again to FIG. 2, the area occupied by each depression 18 may be approximated by a triangle 32, and area occupied by each convex region 30 may be approximated by a triangle 34. The combined total areas of the triangles 32 range from about 45% to about 55% of the total surface area of the second outer portion 14. Likewise, the combined total areas of the triangles 34 range from about 55% to about 45% of the total surface area of the second outer portion 14. Accordingly, a ratio between the total surface area of the convex regions 30 and the total surface area of the depressions 18 ranges from about 0.82 to about 1.22. Each of the three-sided islands 26 may be approximated by a triangle 38 having a surface area that is less than or equal to about 4% of the surface area of the triangle 32.

As shown in FIGS. 4 and 5, the depressions 18 cover a substantial portion of the second outer portion 14 of the blow-molded plastic structure 10. Additionally, while the depressions 18 are shown and described as being located in the second outer portion 14 of the structure 10, the depressions 18 be formed in any desired portion of the structure 10. The depressions 18 may be spaced so that each depression 18 contacts an adjacent depression in an adjacent row 22 and adjacent column 24 thereof over a significant portion of the second outer portion 14.

While the tripodal depressions 18, convex regions 30, and three-sided islands 26 provide increased load carrying characteristics for the blow-molded plastic structure 10, the second outer portion 14 may include additional structures that provide increased resistance to the flexibility of the structure 10. In some embodiments, the second outer portion 14 also includes one or more beams 40 and 42 which may be integrally molded into the second outer portion 14 and may surround an area 44 containing the tripodal depressions 18 as shown. Additional stiffening of the second outer portion 14 may be provided by a raised lip 46 that is also integrally molded into the second outer portion 14 of the structure 10.

Advantageously, the relatively small distance between the depressions 18 increases the structural integrity and strength of the blow-molded structure 10, which allows the thicknesses T1 and T2 of the first and second outer portions 12 and 14 of the blow-molded structure 10 to be reduced. Accordingly, less plastic material may be used to construct the blow-molded plastic structures 10 because of the reduced thicknesses of the first and second outer portions. Minimizing the amount of plastic used to produce the structure 10 may reduce the cost of the structure as well as reduce cooling times and thus manufacturing times for the structures 10. More rapid cooling of the structure 10 enables the structure to be removed from the mold more quickly. The size and shape of the depressions 18 may also reduce the need for multiple beams 40 and 42 to reduce the flexibility of the structure 10.

Figure 6:
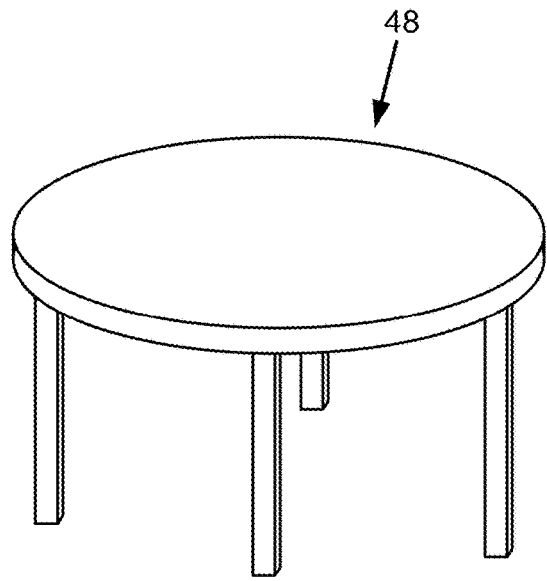
FIGS. 6 and 8 are perspective views, not to scale, of tables containing a blow-molded plastic structure according to the disclosure.
Figure 7:
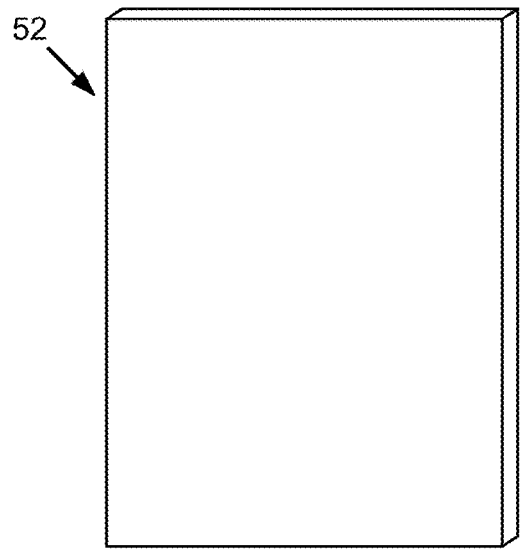
FIG. 7 is a perspective view, not to scale, of a panel containing a blow-molded plastic structure according to the disclosure.
Figure 8:
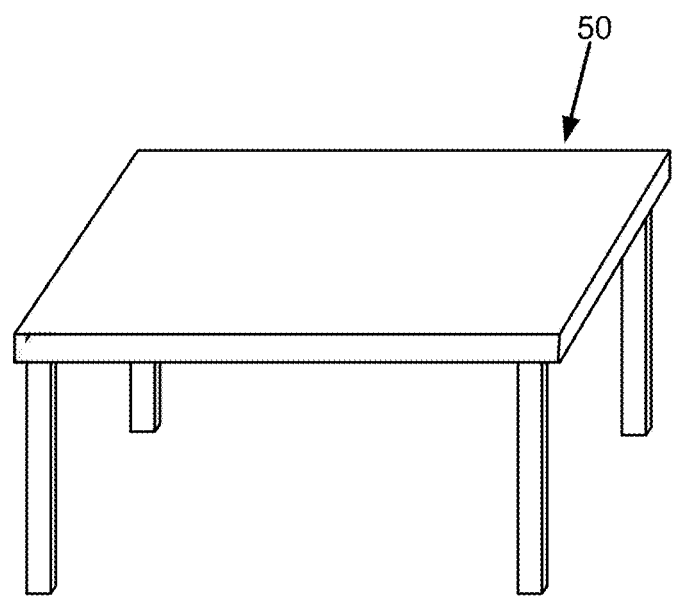
Figure 9:
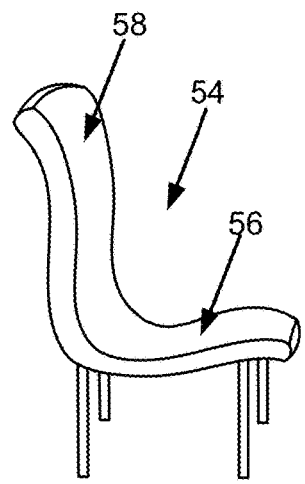
FIG. 9 is a perspective view, not to scale, of a chair containing a blow-molded plastic structure according to the disclosure.
Figure 10A:
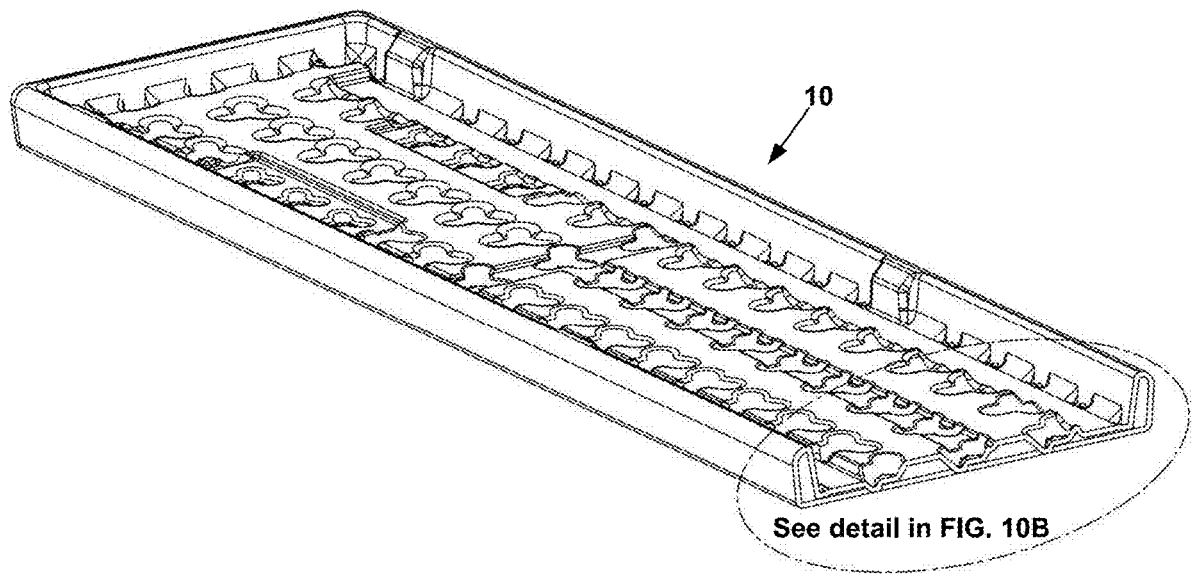
FIGS. 10A and 10B are cross-sectional perspective views of a blow-molded plastic structure according to a second embodiment.

Non-limiting examples of items that may incorporate the blow-molded structure 10 may include tables 48 and 50 (FIGS. 6 and 8), which may be foldable and/or collapsible tables, a partition wall 52 (FIG. 7) that may be used as a structural panel in a wall or partition or other portions of a building, a chair 54 (FIG. 9) that may use the blow-molded plastic structure 10 as part of a seat 56 and/or back support 58 thereof, and a bench (FIG. 10A).

Second Embodiment

Figure 11:
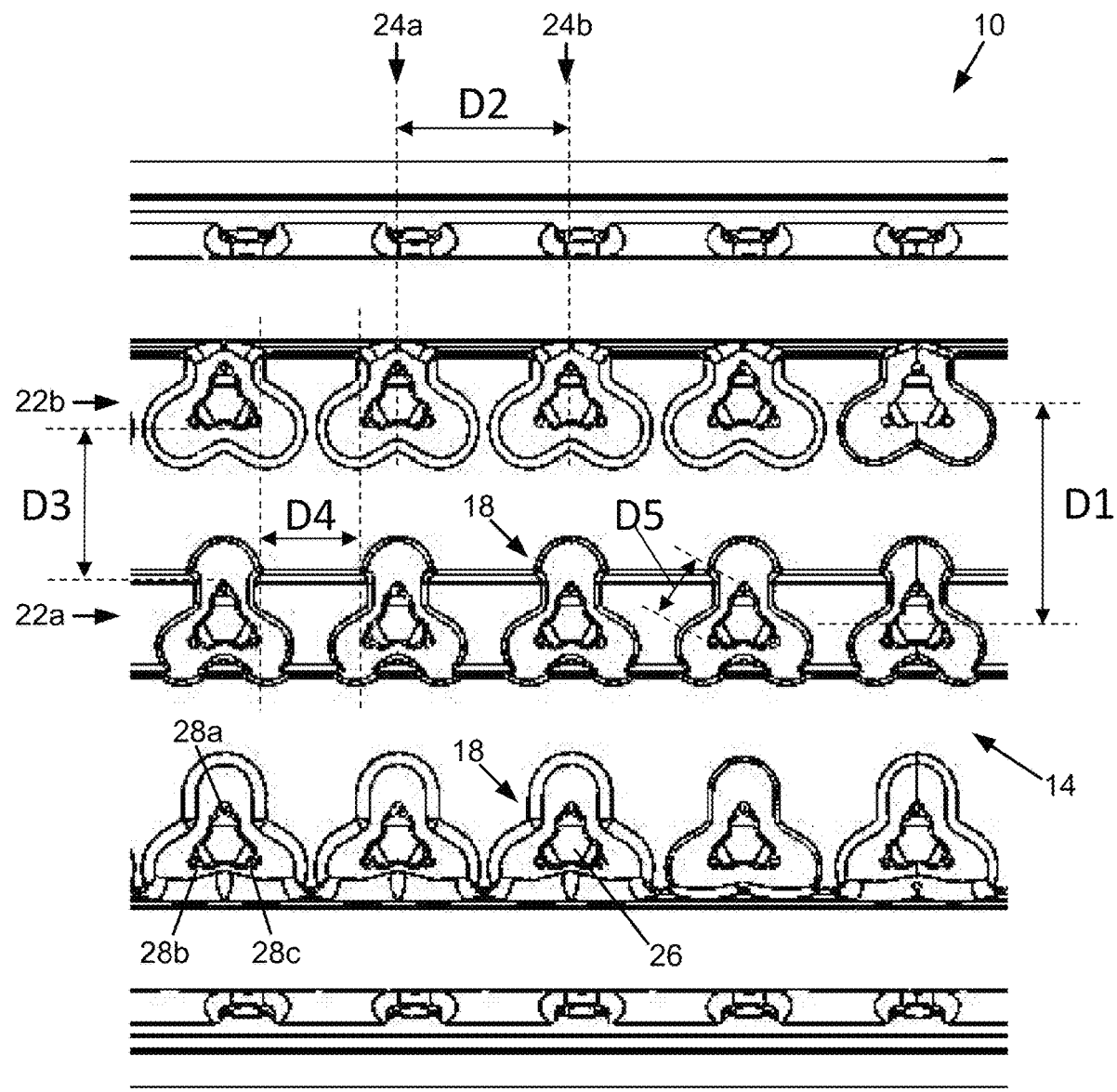
FIG. 11 is a partial plan view of a second outer portion of a blow-molded plastic structure according to the second embodiment.

Referring now to FIG. 11, a plan view of the second outer portion 14 of a second embodiment of the structure 10 is shown. As in the first embodiment, in the center of each depression 18 is a three-sided island 26 space part from the first outer portion 12. Each depression 18 also includes an indentation adjacent to each side of the three sided island 26, shown as indentations 28a, 28b and 28c. The indentations 28a-c and island 26 form the central portion of the tripodal depression 18. In the second embodiment, the center-to-center spacing D5 between the indentations 28a-c within each depression 18 ranges from about 16.2 mm to about 19.8 mm. In a preferred embodiment, the distance D5 is 18.0 mm. A centerline of each row 22a of tripodal depressions 18 is spaced apart from an adacent row 22b by a distance D1 that ranges from about 61.0 mm to about 67.4 mm. In a preferred embodiment, the distance D1 is 64.2 mm. Likewise, each column 24a of tripodal depressions 18 is spaced apart from an adjacent column 24b by a distance D2 that ranges from about 49.1 mm to about 54.3 mm. In a preferred embodiment, the distance D2 is 51.7 mm. As shown, the indentations 28a in one row 22a are spaced from indentations 28b and 28c in an adjacent row 22b by a distance D3 that ranges from about 42.6 mm to about 47.0 mm, and indentations 28b in column 24b are spaced from indentations 28c in column 24a by a distance D4 that ranges from about 28.7 mm to about 31.7 mm. In a preferred embodiment, the distance D3 is 44.8 mm and the distance D4 is 30.2 mm.

Figure 10B:
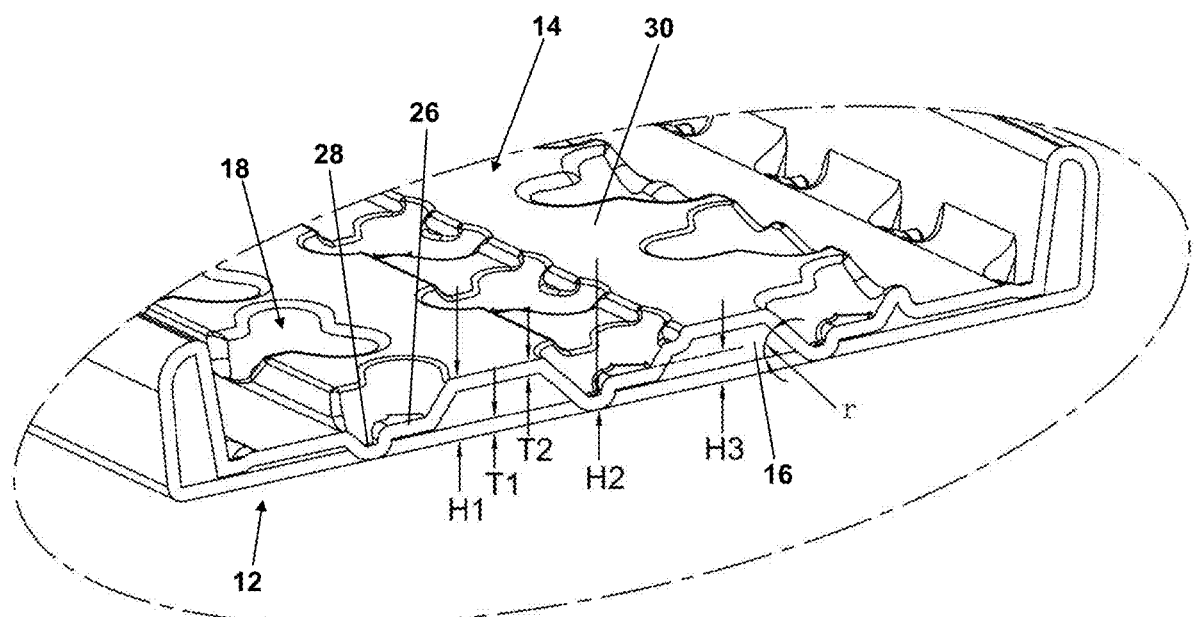

With reference to FIGS. 10A and 10B, a partial perspective, cross-sectional view of the second embodiment of the plastic molded structure 10 is illustrated. As shown, the structural stiffening features include interspersed regions 30 of the second outer portion 14 that are disposed between the depressions 18 and have a height H1 (distance from the first outer portion 12) that ranges from about 16.0 mm to about 17.8 mm. In a preferred embodiment, the height H1 is 16.9 mm.

As shown in FIG. 10B, within each indentation 18, the height H2 between the second outer portion 14 and the first outer portion 12 ranges from about 3.6 mm to about 4.8 mm and is preferably less than about 25% of the height H1. In a preferred embodiment, the height H2 is 4.2 mm. The three-sided islands in the depressions 18 have a central height H3 that is preferably more than about 49% of the height H1 and less than about two times the height H2. The height H3 may range from about 7.5 mm to about 8.9 mm. In a preferred embodiment, the height H3 is 8.4 mm. The total depth of the each indentation 28 (H1-H2) and is preferably at least about 75% of the height H1.

Also shown in FIG. 10B, an angle r is formed between the first outer portion 12 and the second outer portion 14. In various embodiments, the angle r may range from about 38 degrees to about 55 degrees. In one preferred embodiment, the angle r is about 44.2 degrees.

In order to provide the desired structural performance of the blow-molded plastic structure 10, the plastic material of the second outer portion 14 typically has a material thickness T2 ranging from about 2.6 mm to about 3.3 mm. The plastic material of the first outer portion 12 preferably has a material thickness T1 ranging from about 3.1 mm to about 3.8 mm. Table 2 below provides three examples of material thicknesses T1 and T2 and with corresponding variations in height dimensions H1, H2, and H3.

TABLE 2

| Example | T1 | T2 | H1 | H2 | H3 |
|---|---|---|---|---|---|
| 1 | 3.78 | 3.34 | 16.81 | 4.22 | 8.24 |
| 2 | 3.58 | 3.04 | 16.87 | 4.18 | 8.35 |
| 3 | 3.07 | 2.62 | 16.88 | 4.07 | 8.45 |

Third Embodiment

Figure 12A:
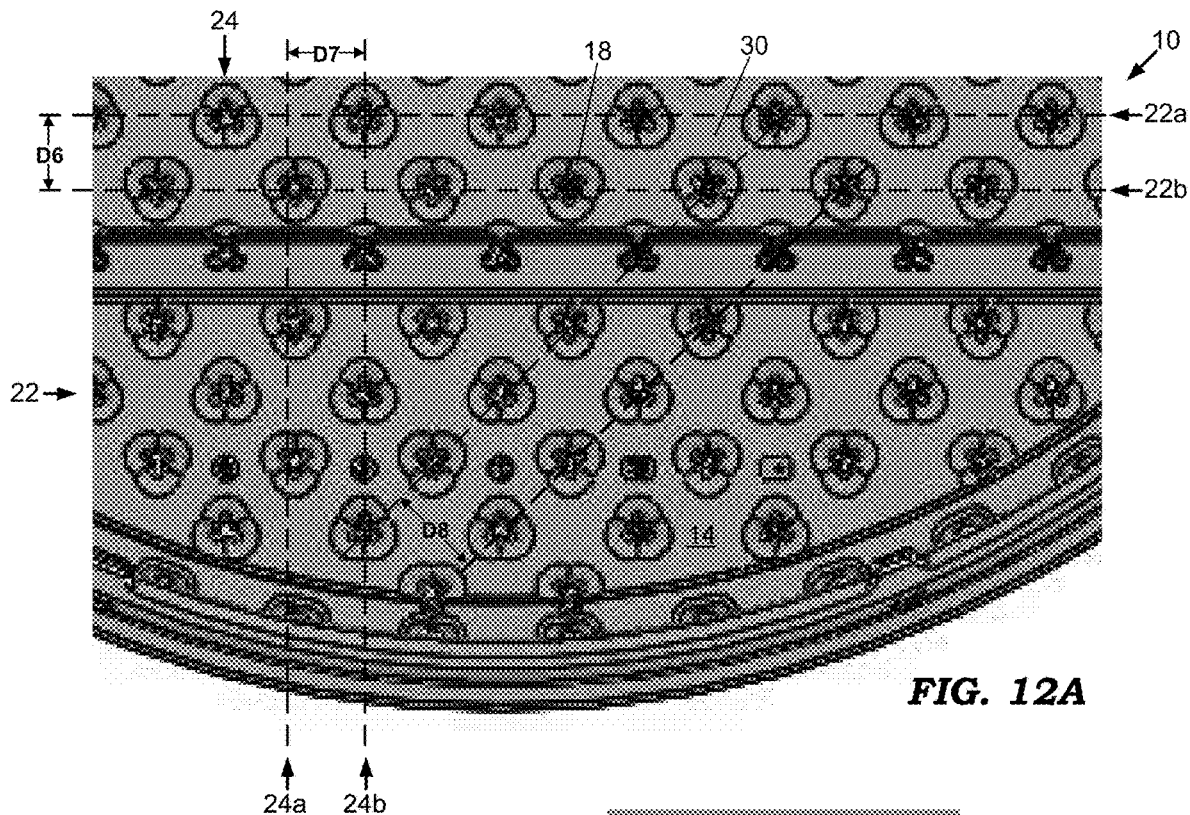
FIGS. 12A and 12B are partial plan views of the second outer portion of a blow-molded plastic structure according to a third embodiment.

FIGS. 12A-12D depict a portion of a blow-molded plastic structure 10 according to a third embodiment of the invention. The structure 10 includes a generally planar first outer portion 12 as described in the other embodiments, and a second outer portion 14 that is generally spaced apart from the first outer portion 12. The first and second outer portions enclose a hollow interior portion 16 formed during the blow-molding process. The third embodiment includes a pattern of structural stiffening features in the form of the tripodal depressions 18 integrally formed in the second outer portion 14 of the structure 10. Each depression 18 extends toward the first outer portion 12 of the structure. The depressions 18 are arranged in rows 22 and columns 24 in the second outer portion 14, and this pattern may be repeated over a substantial portion of the second outer portion 14 of the structure. As shown in FIG. 12A, the rows 22 and columns 24 may be arranged such that each tripodal depression 18 is closely adjacent to another tripodal depression 18 in an adjacent row 22 and column 24 over a substantial portion of the second outer portion 14.

In the third embodiment, all of the depressions 18 in each row are rotationally flipped by 180 degrees with respect to all of the depressions 18 in adjacent rows. For example, in FIG. 12A, all of the depressions 18 in row 22a are rotationally flipped by 180 degrees with respect to all of the depressions 18 in row 22b. Also, all of the depressions 18 in each column are rotationally flipped by 180 degrees with respect to all of the depressions 18 in adjacent columns. For example, all of the depressions 18 in column 24a are rotationally flipped by 180 degrees with respect to all of the depressions 18 in column 24b.

Figure 12B:
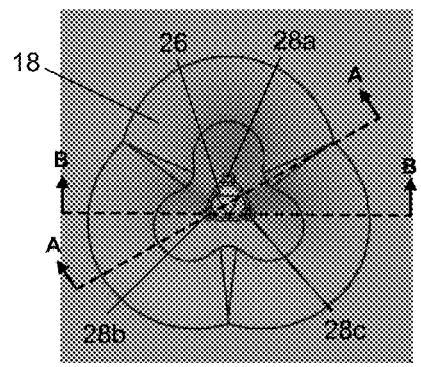
Figure 12C:
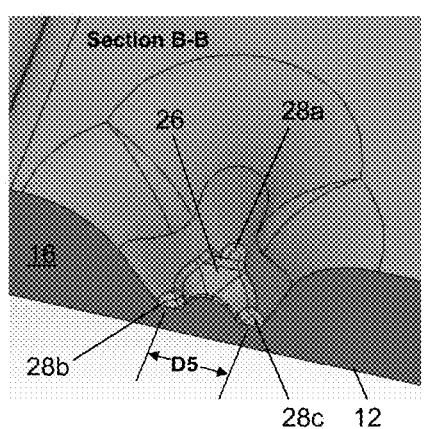
FIGS. 12C and 12D are cross-sectional views of the blow-molded plastic structure according to the third embodiment.

As shown in FIGS. 12B-12C, in the center of each depression 18 is a three-sided island 26 space part from the first outer portion 12. Each depression 18 also includes an indentation adjacent to each side of the three sided island 26, shown as indentations 28a, 28b and 28c. Accordingly, as shown, the indentations 28a-c and island 26 form the central portion of the tripodal depression 18 in the second outer portion 14 of the structure 10. In the third embodiment, the center-to-center spacing D5 between the indentations 28a-c within each depression 18 ranges from about 11 mm to about 14 mm, and is preferably 12.5 mm. A centerline of each row 22a of tripodal depressions 18 is spaced apart from an adjacent row 22b by a distance D6 that ranges from about 49.5 mm to about 60.5 mm, and is preferably 55.0 mm. Likewise, each column 24a of tripodal depressions 18 is spaced apart from an adjacent column 24b by a distance D7 that ranges from about 49.5 mm to about 60.5 mm, and is preferably 55.0 mm. The centerline spacing between adjacent depressions 18 in each row and between adjacent depressions 18 in each column is about 99 mm to about 121 mm, and is preferably 110 mm. The diagonal centerline spacing D8 is about 70 mm to about 86 mm, and is preferably 78 mm.

Figure 12D:
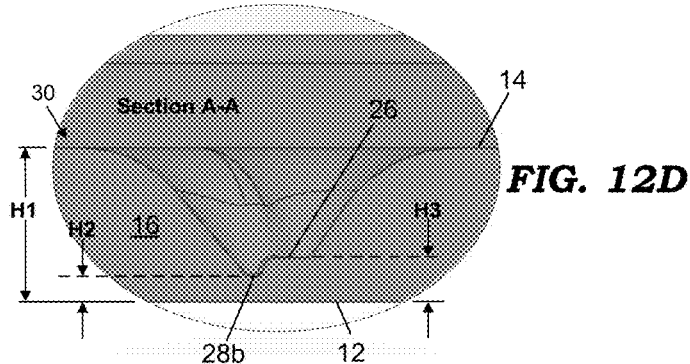

As shown in FIG. 12D, the structural stiffening features include the interspersed regions 30 of the second outer portion 14 that are disposed between the depressions 18. The interspersed regions 30 have a height H1 (distance from the first outer portion 12 to the second outer portion 14) that ranges from about 29.7 mm to about 36.3 mm, and is preferably 33.0 mm. Within each indentation 28a-28c, the height H2 between the second outer portion 14 and the first outer portion 12 ranges from about 5.0 mm to about 6.0 mm. In a preferred embodiment, the height H2 is 5.5 mm. The total depth of the each indentation 28a-28c (H1-H2) and is preferably at least about 83% of the height H1. Also within each indentation 28a-28c, the second outer portion 14 may be spaced apart from or may contact the first outer portion 12 of the blow-molded plastic structure, depending on the load placed on the structure 10. The three-sided islands 26 in the depressions 18 have a central height H3 that is preferably greater than about 20% of the height H1 and less than about 1.3 times the height H2. The height H3 may range from about 6.0 mm to about 7.5 mm, and is preferably 6.9 mm.

In the third embodiment, the plastic material thicknesses T1 and T2 range from about 3.8 mm to about 4.0 mm. As will be appreciated by those skilled in the art, the plastic thicknesses T1 and T2 may vary depending on the particular application for the blow-molded plastic structure 10.

Fourth Embodiment

Figure 13A:
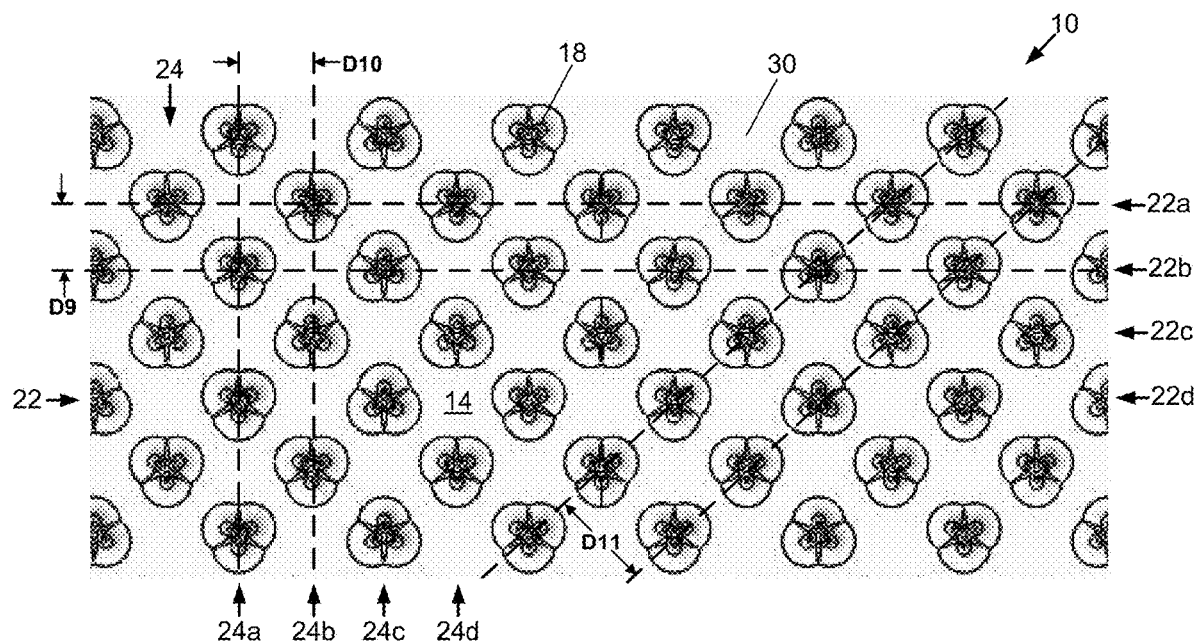
FIGS. 13A and 13B are partial plan views of the second outer portion of a blow-molded plastic structure according to a fourth embodiment.
Figure 13B:
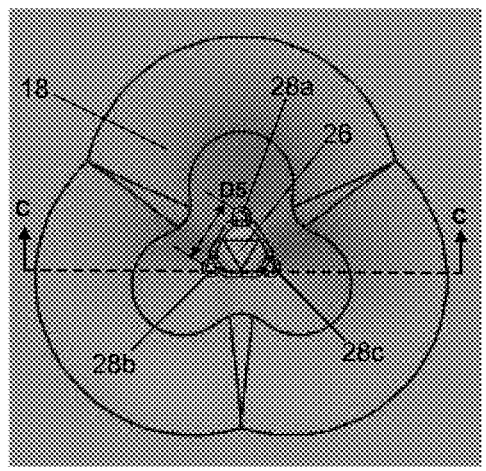
Figure 13C:
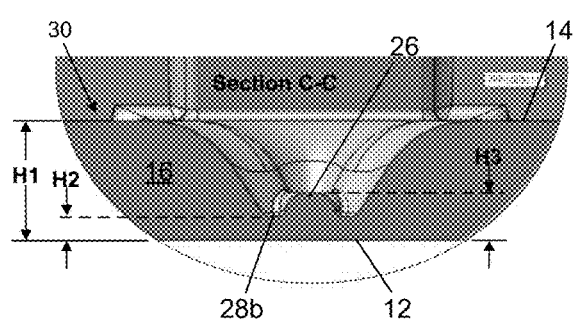
FIG. 13C is a cross-sectional view of the blow-molded plastic structure according to the fourth embodiment.
Figure 14A:
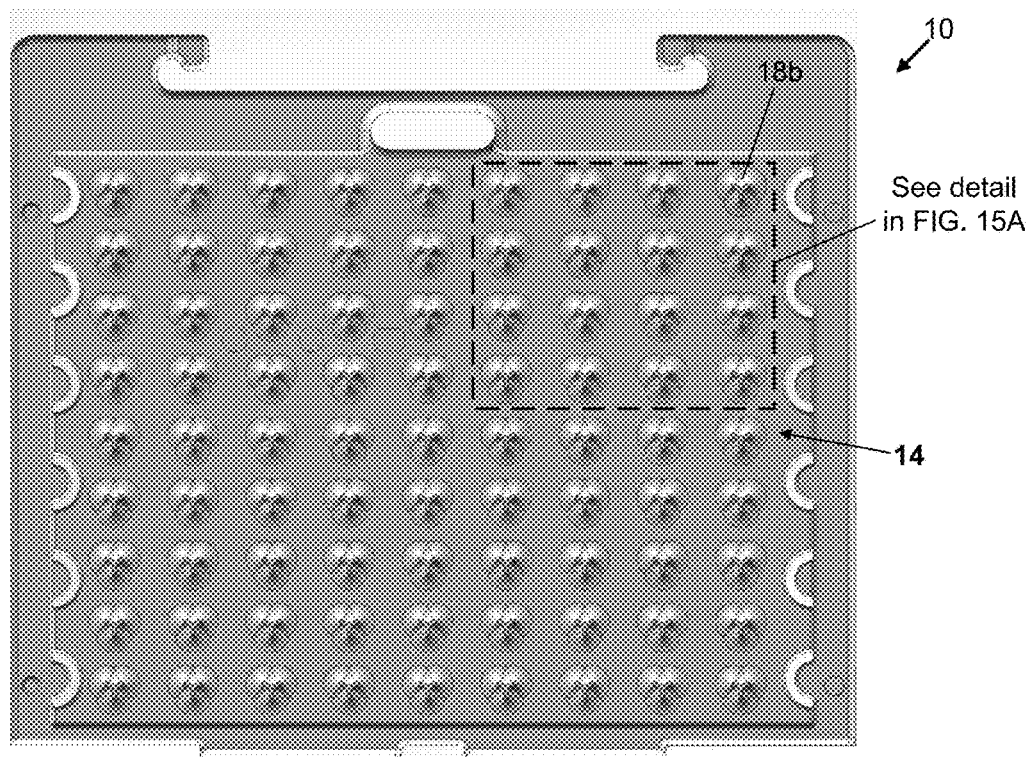
FIGS. 14A and 14B depict opposing sides of a panel of a portable collapsible sign having a blow-molded plastic structure according to a fifth embodiment.
Figure 14B:
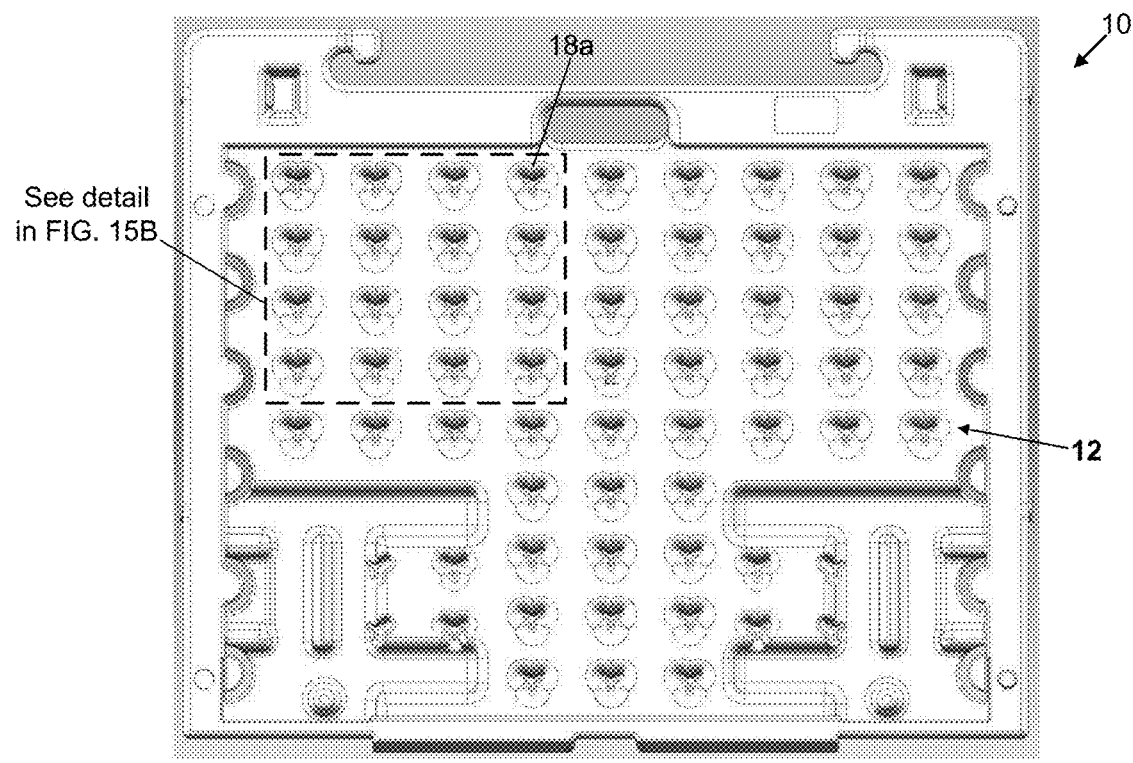

FIGS. 13A-13C depict a portion of a blow-molded plastic structure 10 according to a fourth embodiment of the invention. The structure 10 includes a generally planar first outer portion 12 as described in the other embodiments, and a second outer portion 14 that is generally spaced apart from the first outer portion 12. The first and second outer portions enclose a hollow interior portion 16 formed during the blow-molding process. The fourth embodiment includes a pattern of structural stiffening features in the form of the tripodal depressions 18 integrally formed in the second outer portion 14 of the structure 10. Each depression 18 extends toward the first outer portion 12 of the structure. The depressions 18 are arranged in rows 22 and columns 24 in the second outer portion 14, and this pattern may be repeated over a substantial portion of the second outer portion 14 of the structure. As shown in FIG. 13A, the rows 22 and columns 24 may be arranged such that each tripodal depression 18 is closely adjacent to another tripodal depression 18 in an adjacent row 22 and column 24 over a substantial portion of the second outer portion 14.

As depicted in FIG. 13A, in the fourth embodiment, all of the depressions 18 in row 22a are rotationally aligned in the same direction. The rotational alignments of the depressions 18 in the adjacent row 22b alternate from one to the next by 180 degrees. All of the depressions 18 in row 22c are rotationally aligned in the same direction, but they are rotationally flipped by 180 degrees with respect to the corresponding depressions 18 in row 22a. All of the depressions 18 in row 22d are aligned in the same directions as the corresponding depressions 18 in row 22b. The pattern repeats beginning at the row below row 22d.

With continued reference to FIG. 13A, all of the depressions 18 in column 24a are rotationally aligned in the same direction. The rotational alignments of the depressions 18 in the adjacent column 24b alternate from one to the next by 180 degrees. All of the depressions 18 in column 24c are rotationally aligned in the same direction, but they are rotationally flipped by 180 degrees with respect to the corresponding depressions 18 in column 24a. All of the depressions 18 in column 24d are aligned in the same directions as the corresponding depressions 18 in column 24b. The pattern repeats beginning at the column to the right of column 24d.

As shown in FIGS. 13B-13C, in the center of each depression 18 is a three-sided island 26 space part from the first outer portion 12. Each depression 18 also includes an indentation adjacent to each side of the three sided island 26, shown as indentations 28a, 28b and 28c. Accordingly, as shown, the indentations 28a-c and island 26 form the central portion of the tripodal depression 18 in the second outer portion 14 of the structure 10. In the fourth embodiment, the center-to-center spacing D5 between the indentations 28a-c within each depression 18 ranges from about 11 mm to about 14 mm, and is preferably 12.5 mm. A centerline of each row 22a of tripodal depressions 18 is spaced apart from an adjacent row 22b by a distance D9 that ranges from about 39.6 mm to about 48.4 mm, and is preferably 44.0 mm. Likewise, each column 24a of tripodal depressions 18 is spaced apart from an adjacent column 24b by a distance D10 that ranges from about 43.2 mm to about 52.2 mm, and is preferably 48.0 mm. The centerline spacing between adjacent depressions 18 in each row is about 86 mm to about 106 mm, and is preferably 96 mm. The centerline spacing between adjacent depressions 18 in each column is about 79 mm to about 97 mm, and is preferably 88 mm. The diagonal centerline spacing D11 is about 58.6 mm to about 71.6 mm, and is preferably 65.1 mm.

As shown in FIG. 13C, the structural stiffening features include the regions interspersed 30 of the second outer portion 14 that are disposed between the depressions 18. The interspersed regions 30 have a height H1 (distance from the first outer portion 12 to the second outer portion 14) that ranges from about 18.0 mm to about 22.0 mm, and is preferably 20.0 mm. Within each indentation 28a-28c, the height H2 between the second outer portion 14 and the first outer portion 12 ranges from about 5.4 mm to about 6.6 mm. In a preferred embodiment, the height H2 is 6.0 mm. The total depth of the each indentation 28a-28c(H1-H2) and is preferably at least about 83% of the height H1. Also within each indentation 28a-28c, the second outer portion 14 may be spaced apart from or may contact the first outer portion 12 of the blow-molded plastic structure, depending on the load placed on the structure 10. The three-sided islands 26 in the depressions 18 have a central height H3 that is preferably greater than 20% of the height H1 and less than about 1.3 times the height H2. The height H3 may range from about 7.2 mm to about 8.8 mm, and is preferably 8.0 mm.

In the fourth embodiment, the plastic material thicknesses T1 and T2 range from about 3.8 mm to about 4.0 mm.

Fifth Embodiment

FIGS. 14A-14B, 15A-15B, 16 and 17A-17E depict a blow-molded plastic frame 10 of a portable collapsible sign according to a fifth embodiment of the invention. The frame 10 includes a generally planar first outer portion 12 spaced apart from a generally planar second outer portion 14. The first and second outer portions enclose a hollow interior portion 16 formed during the blow-molding process. The frame 10 includes a pattern of structural stiffening features comprising first depressions 18a integrally formed in the first outer portion 12 and second depressions 18b formed in the second outer portion 14. Each first depression 18a extends inwardly from the first outer portion 12 toward a coaligned second depression 18b in the second outer portion 14 of the structure, and each second depression 18b extends inwardly from the second outer portion 14 toward a coaligned first depression 18a in the first outer portion 12.

The first and second depressions 18a and 18b are preferably arranged in rows 22 and columns 24 in the first and second outer portions 12 and 14, and this pattern may be repeated over a substantial region of the first and second outer portions 12 and 14. The rows 22 and columns 24 are preferably arranged such that each first depression 18a is closely adjacent to another first depression 18a in an adjacent row 22 and column 24 over a substantial area of the first outer portion 12, and such that each second depression 18b is closely adjacent to another second depression 18b in an adjacent row 22 and column 24 over a substantial area of the second outer portion 14. The centerline spacing D13 between adjacent depressions 18a-18b in each row 22 is about 60 mm to about 66 mm, and is preferably about 63 mm. The centerline spacing D12 between adjacent depressions 18a-18b in each column 24 is about 47 mm to about 53 mm, and is preferably about 50 mm.

As shown in FIGS. 17A-17E, centered in the bottom of each first and second depression 18a and 18b is a three-armed surface that is referred to herein as the floor 36. Each floor 36 comprises three arms 28a, 28b and 28c having rotational symmetry, with each arm rotated from the others by 120 degrees. Accordingly, the floor 36 forms the central portion of each first and second depression 18a and 18b in the first and second outer portions 12 and 14 of the frame 10. In a preferred embodiment, the spacing D14 between the ends of the arms 28a-28c within each depression 18a-18b ranges from about 11 mm to about 14 mm, and is preferably about 12 mm.

Figure 15A:
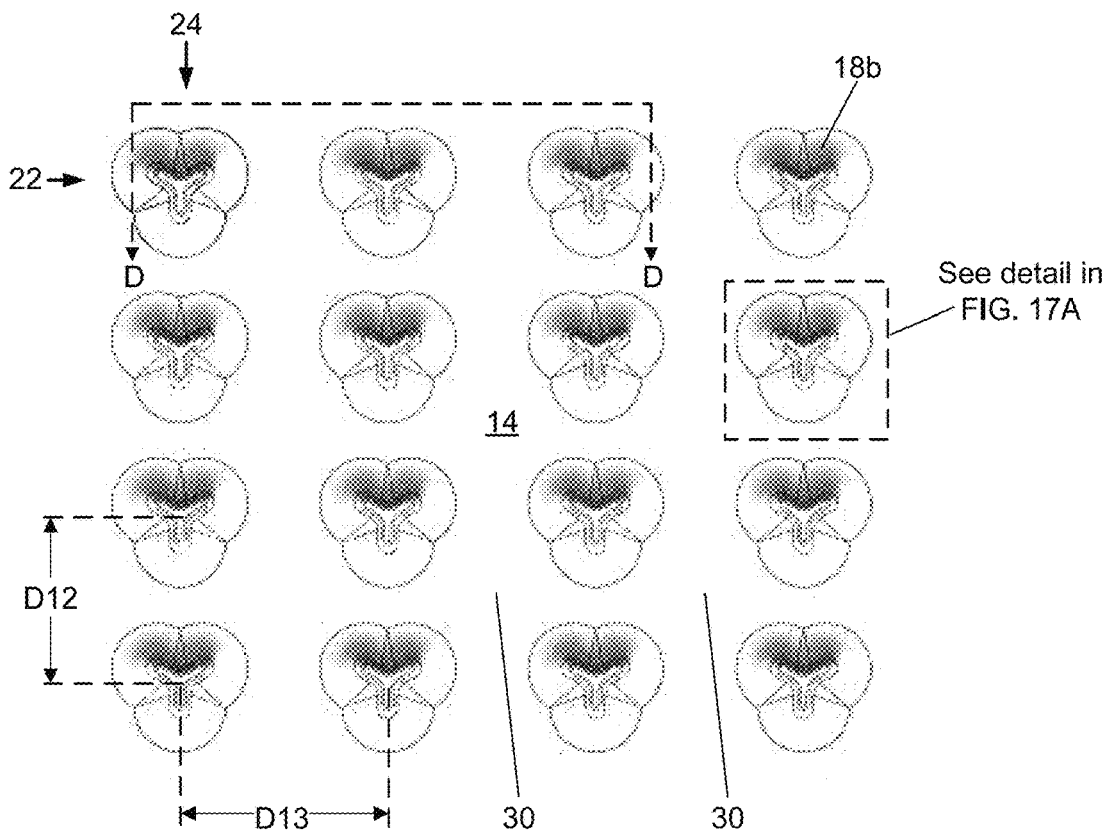
FIGS. 15A and 15B depict detailed views of the opposing sides of the panel depicted in FIGS. 14A and 14B.
Figure 15B:
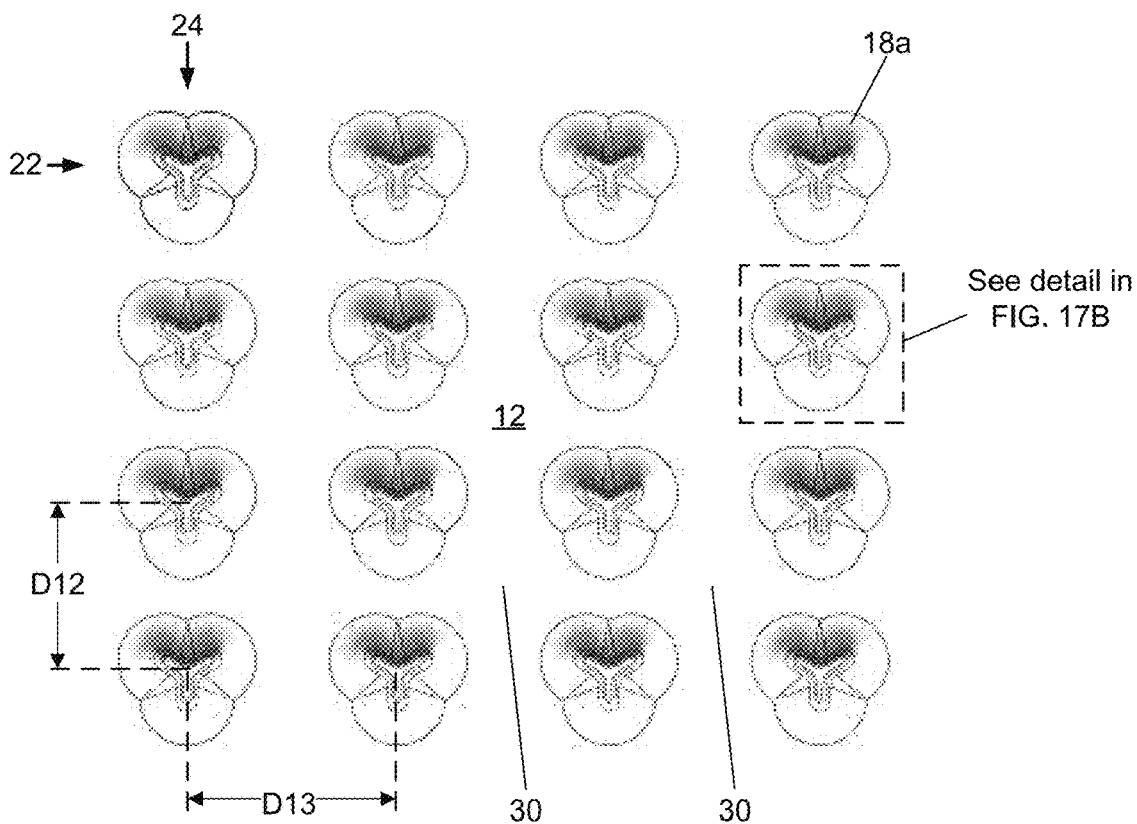

As shown in FIGS. 15A and 15B, the structural stiffening features include the regions 30 interspersed between the depressions 18a within the first outer portion 12 and between the depressions 18b within the second outer portion 14. As shown in FIGS. 17C and 17E, the height H1 (distance from the first outer portion 12 to the second outer portion 14 within the interspersed regions 30) ranges from about 13.7 mm to about 20.3 mm, and is preferably about 17 mm. As shown in FIG. 17E, the height H4a between the first outer portion 12 and the floor 36 within each depression 18a ranges from about 7.5 mm to about 11.5 mm, and is preferably about 9.5 mm. Similarly, as shown in FIG. 17C, the height H4b between the second outer portion 14 and the floor 36 within each depression 18b ranges from about 2.5 mm to about 6.5 mm, and is preferably about 4.5 mm. As also shown in FIGS. 17C and 17E, the height H5 between the floor 36 of each depression 18a and the floor 36 of the aligned depression 18b ranges from about 2 mm to about 5 mm, and is preferably about 3 mm.

Figure 16:
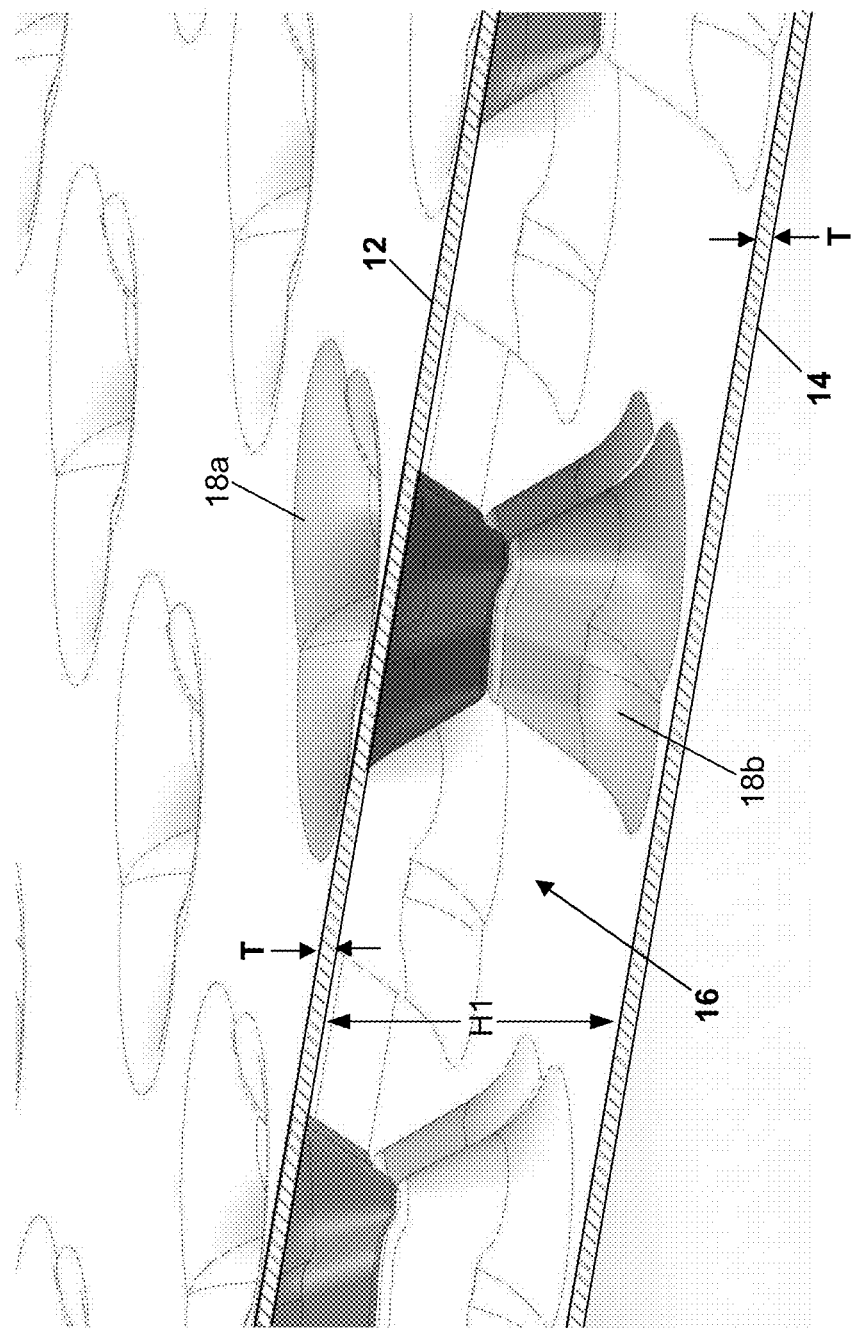
FIG. 16 depicts a cross section view of the panel depicted in FIGS. 14A and 14B.

As shown in FIG. 16, the thickness T of the plastic material ranges from about 2.0 mm to about 4.0 mm.

Advantages Over Conventional Structures

Ease of Production. Because the edges of the depressions 18a and 18b have a large radius of curvature (R), the structure 10 can be more easily removed from the blow molding machine.

Increased Strength. During the production, the quantity of plastic material (such as HDPE) provided to the mold must be adjusted to provide an optimum amount of material for the drawing of the depression structure in the mold. The curved structure of the depressions 18a and 18b described herein allows for higher quantities of the plastic material for the entire structure 10, thereby helping to ensure that the areas of the structure around the depressions 18a and 18b will not be too soft when drawn in the mold. In this way, adequate strength can be more evenly maintained across the top and bottom surfaces of the structure 10.

Reduced Defective Rate. Because of the large radius of curvature (R) of the depressions 18a and 18b, the depth to which material is drawn in the mold is not as deep as is typical of conventional blow-molded structures. Thus, the drawing area of the bottom surface of the structure 10 will not be too soft, thereby significantly reducing the rate of defects caused by low strength in the bottom surface.

Better Performance. Because the depressions 18a and 18b are not as deep as depressions in conventional blow-molded structures, the bottom surface of the structure 10 can be thinner, which requires less material. Less material in the bottom surface allows for more material to be used in the top surface without an overall increase in material per unit. This allows for the top surface to be made thicker, and therefore stronger and more durable, which results in better physical performance, such as in impact tests and loading tests.

Less Material Required for Production. Also because the depressions 18a and 18b are not as deep as depressions in conventional blow-molded structures, less material per unit is needed for production of the structure 10, while maintaining at least the same strength as conventional structures.

Reduced Production Time. Because of the depression structure, the wall thickness over the entire structure 10 can be more even than is possible with conventional blow-molded structures. This allows production workers to be able to adjust and fine-tune the operation of the blow-mold machine for the structure 10 faster and more efficiently than was possible with conventional structures. This reduces the idle time for the machine.

Support of Three-Indentation Depressions. Because the depressions 18*a* and 18*b* having three arms 28*a*, 28*b*, 28*c*, can be more evenly distributed across the bottom surface of the structure 10, the material drawing rate in the mold can be reduced. Although a four-arm depression embodiment may provide greater strength overall, four-arm depressions require a higher drawing rate, which requires more material per unit for production. Thus, from a material standpoint, the three-arm depressions 18*a* and 18*b* of the preferred embodiment provide an advantage over a four-arm design.

The present invention may be embodied in other specific forms without departing from its spirit or essential characteristics. The described embodiments are to be considered in all respects only as illustrative and not restrictive. The range and scope of the disclosed embodiments is, therefore, indicated by appended claims. All changes which come within meaning and scope of the appended claims are to be embraced within their scope.

What is claimed is:

1. A blow-molded plastic structure having a hollow interior portion formed during a blow-molding process, the blow-molded plastic structure comprising:
   a first outer portion;
   a second outer portion that is spaced apart from the first outer portion, wherein the hollow interior portion is disposed between the first and second outer portions, and wherein a distance between the first and second outer portions is defined by a first height; and
   a pattern of structural stiffening features integrally formed in the first and second outer portions, the pattern of structural stiffening features comprising:
      a plurality of first depressions extending from the first outer portion into the hollow interior portion, the first depressions disposed in rows and columns, each first depression including a first floor spaced apart from the first outer portion by a second height that ranges from about 7.5 millimeters to 11.5 millimeters, the first floor comprising a plurality of first arms, one or more of the first arms rotated with respect to an adjacent one of the first arms by a first angle; and
      a plurality of second depressions extending from the second outer portion into the hollow interior portion, the second depressions disposed in rows and columns, each second depression including a second floor spaced apart from the second outer portion, the second floor comprising a plurality of second arms, one or more of the second arms rotated with respect to an adjacent one of the second arms by a second angle,
      wherein the first floor of each first depression is aligned with the second floor of an adjacent second depression.

2. The blow-molded plastic structure of claim 1, wherein the plurality of first arms comprise three first arms, the plurality of second arms comprise three second arms, the first angle is 120 degrees, and the second angle is 120 degrees.

3. The blow-molded plastic structure of claim 1, wherein a center-to-center spacing between first depressions in each row of first depressions is greater than three times the first height, and a center-to-center spacing between second depressions in each row of second depressions is greater than three times the first height.

4. The blow-molded plastic structure of claim 1, wherein a center-to-center spacing between first depressions in each row of first depressions is about 63 millimeters, and a center-to-center spacing between second depressions in each row of second depressions is about 63 millimeters.

5. The blow-molded plastic structure of claim 1, wherein a center-to-center spacing between first depressions in each column of first depressions is greater than two times the first height, and a center-to-center spacing between second depressions in each column of second depressions is greater than two times the first height.

6. The blow-molded plastic structure of claim 1, wherein a center-to-center spacing between first depressions in each column of first depressions is about 50 millimeters, and a center-to-center spacing between second depressions in each column of second depressions is about 50 millimeters.

7. The blow-molded plastic structure of claim 1, wherein the first height ranges from about 13.7 millimeters to about 20.3 millimeters.

8. The blow-molded plastic structure of claim 1, wherein the second floor of each second depression is spaced away from the second outer portion by a third height that ranges from about 2.5 millimeters to 6.5 millimeters.

9. The blow-molded plastic structure of claim 1, wherein the first floor of each first depression is spaced away from the second floor of an adjacent second depression by a fourth height that ranges from about 2 millimeters to 5 millimeters.

10. The blow-molded plastic structure of claim 1, wherein each of the first arms of the first floor of each first depression is aligned with a corresponding one of the second arms of the second floor of an adjacent second depression.

11. The blow-molded plastic structure of claim 1, comprising a portion of a frame of a portable collapsible sign.

12. A blow-molded plastic frame for a portable collapsible sign, the blow-molded plastic frame comprising:
   a first outer portion of the frame;
   a second outer portion of the frame that is spaced apart from the first outer portion, wherein a distance between the first and second outer portions is defined by a first height;
   a hollow interior portion disposed between the first and second outer portions; and
   a pattern of structural stiffening features integrally formed in the first and second outer portions, the pattern of structural stiffening features comprising:
      a plurality of first depressions extending from the first outer portion into the hollow interior portion, the first depressions disposed in rows and columns, each first depression including a first floor spaced apart from the first outer portion by a second height that ranges from about 7.5 millimeters to 11.5 millimeters, the first floor comprising three first arms having rotational symmetry, with each first arm rotated from another first arms by 120 degrees; and
      a plurality of second depressions extending from the second outer portion into the hollow interior portion, the second depressions disposed in rows and columns, each second depression including a second floor spaced apart from the second outer portion, the second floor comprising three second arms having rotational symmetry, with each second arm rotated from another second arms by 120 degrees, wherein the first floor of each first depression is aligned with the second floor of an adjacent second depression.

13. The blow-molded plastic frame of claim 12, wherein a center-to-center spacing between first depressions in each row of first depressions is greater than three times the first height, and a center-to-center spacing between second depressions in each row of second depressions is greater than three times the first height.

14. The blow-molded plastic frame of claim 12, wherein a center-to-center spacing between first depressions in each row of first depressions is about 63 millimeters, and a center-to-center spacing between second depressions in each row of second depressions is about 63 millimeters.

15. The blow-molded plastic frame of claim 12, wherein a center-to-center spacing between first depressions in each column of first depressions is greater than two times the first height, and a center-to-center spacing between second depressions in each column of second depressions is greater than two times the first height.

16. The blow-molded plastic frame of claim 12, wherein a center-to-center spacing between first depressions in each column of first depressions is about 50 millimeters, and a center-to-center spacing between second depressions in each column of second depressions is about 50 millimeters.

17. The blow-molded plastic frame of claim 12, wherein the first height ranges from about 13.7 millimeters to about 20.3 millimeters.

18. The blow-molded plastic frame of claim 12, wherein the second floor of each second depression is spaced away from the second outer portion by a third height that ranges from about 2.5 millimeters to 6.5 millimeters.

19. The blow-molded plastic frame of claim 12, wherein the first floor of each first depression is spaced away from the second floor of an adjacent second depression by a fourth height that ranges from about 2 millimeters to 5 millimeters.

20. The blow-molded plastic frame of claim 12, wherein each of the first arms of the first floor of each first depression is aligned with a corresponding one of the second arms of the second floor of an adjacent second depression.

21. A blow-molded plastic structure having a hollow interior portion formed during a blow-molding process, the blow-molded plastic structure comprising:
  a first outer portion;
  a second outer portion that is spaced apart from the first outer portion, wherein the hollow interior portion is disposed between the first and second outer portions, and wherein a distance between the first and second outer portions is defined by a first height; and
  a pattern of structural stiffening features integrally formed in the first and second outer portions, the pattern of structural stiffening features comprising:
    a plurality of first depressions extending from the first outer portion into the hollow interior portion, the first depressions disposed in rows and columns, each first depression including a first floor spaced apart from the first outer portion, the first floor comprising a plurality of first arms, one or more of the first arms rotated with respect to an adjacent one of the first arms by a first angle; and
    a plurality of second depressions extending from the second outer portion into the hollow interior portion, the second depressions disposed in rows and columns, each second depression including a second floor spaced apart from the second outer portion, the second floor comprising a plurality of second arms, one or more of the second arms rotated with respect to an adjacent one of the second arms by a second angle,
  wherein the first floor of each first depression is aligned with the second floor of an adjacent second depression, and
  wherein the first floor of each first depression is spaced away from the second floor of an adjacent second depression by a fourth height that ranges from about 2 millimeters to 5 millimeters.

22. A blow-molded plastic frame for a portable collapsible sign, the blow-molded plastic frame comprising:
  a first outer portion of the frame;
  a second outer portion of the frame that is spaced apart from the first outer portion, wherein a distance between the first and second outer portions is defined by a first height;
  a hollow interior portion disposed between the first and second outer portions; and
  a pattern of structural stiffening features integrally formed in the first and second outer portions, the pattern of structural stiffening features comprising:
    a plurality of first depressions extending from the first outer portion into the hollow interior portion, the first depressions disposed in rows and columns, each first depression including a first floor spaced apart from the first outer portion, the first floor comprising three first arms having rotational symmetry, with each first arm rotated from another first arms by 120 degrees; and
    a plurality of second depressions extending from the second outer portion into the hollow interior portion, the second depressions disposed in rows and columns, each second depression including a second floor spaced apart from the second outer portion, the second floor comprising three second arms having rotational symmetry, with each second arm rotated from another second arms by 120 degrees,
  wherein the first floor of each first depression is aligned with the second floor of an adjacent second depression, and
  wherein the first floor of each first depression is spaced away from the second floor of an adjacent second depression by a fourth height that ranges from about 2 millimeters to 5 millimeters.

* * * * *